(12) United States Patent
Meijer et al.

(10) Patent No.: US 7,865,533 B2
(45) Date of Patent: Jan. 4, 2011

(54) COMPOSITIONAL QUERY COMPREHENSIONS

(75) Inventors: Henricus Johannes Maria Meijer, Mercer Island, WA (US); Amanda K. Silver, Seattle, WA (US); Paul A. Vick, Jr., Seattle, WA (US); Eugueni Zabokritski, Redmond, WA (US); Aleksey V. Tsingauz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 11/671,417

(22) Filed: Feb. 5, 2007

(65) Prior Publication Data

US 2008/0189258 A1    Aug. 7, 2008

(51) Int. Cl.
    G06F 7/00    (2006.01)
(52) U.S. Cl. .................. 707/804; 707/805; 707/807; 707/899; 71/109; 71/110; 71/113; 71/136
(58) Field of Classification Search .......... None
    See application file for complete search history.

(56) References Cited

U.S. PATENT DOCUMENTS

| | | | |
|---|---|---|---|
| 5,197,005 A | 3/1993 | Shwartz et al. | |
| 5,237,502 A | 8/1993 | White et al. | |
| 5,282,265 A | 1/1994 | Rohra Suda et al. | |
| 5,418,943 A | 5/1995 | Borgida et al. | |
| 5,418,948 A | 5/1995 | Turtle | |
| 5,428,737 A | 6/1995 | Li et al. | |
| 6,272,488 B1 * | 8/2001 | Chang et al. | 707/4 |
| 6,341,277 B1 * | 1/2002 | Coden et al. | 707/2 |
| 6,480,836 B1 * | 11/2002 | Colby et al. | 707/3 |
| 6,775,681 B1 | 8/2004 | Ballamkonda et al. | |
| 6,965,990 B2 * | 11/2005 | Barsness et al. | 713/1 |
| 7,086,041 B2 | 8/2006 | Plesko | |
| 7,110,991 B2 | 9/2006 | Arnold | |
| 7,120,898 B2 | 10/2006 | Grover | |
| 7,440,963 B1 * | 10/2008 | Bello et al. | 707/3 |
| 2001/0013030 A1 * | 8/2001 | Colby et al. | 707/1 |
| 2002/0026443 A1 | 2/2002 | Chang et al. | |
| 2004/0172587 A1 | 9/2004 | Lawlor | |
| 2004/0193575 A1 | 9/2004 | Chen | |

(Continued)

FOREIGN PATENT DOCUMENTS

EP    0477152 A3    3/1992

(Continued)

OTHER PUBLICATIONS

Raman, et al. "Partial Results for Online Query Processing" (2002) ACM, 12 pages.

(Continued)

*Primary Examiner*—Tim T. Vo
*Assistant Examiner*—Ahn Tai V Tran
(74) *Attorney, Agent, or Firm*—Workman Nydegger

(57) ABSTRACT

The claimed subject matter relates to an architecture that can facilitate query comprehension that are constructed in a compositional manner. In accordance therewith, the query comprehensions can be assembled together in virtually in order without common requirements that force query operators of a query expression to follow ordering/syntactic rules. In addition, the architecture can provide for query expressions that arbitrarily composable and which can be terminated at any point. If the query expression terminates without a Select or Return clause at the end, the architecture can facilitate generation of an implicit Select or Return, and output results.

18 Claims, 10 Drawing Sheets

U.S. PATENT DOCUMENTS

| | | | |
|---|---|---|---|
| 2004/0267690 A1* | 12/2004 | Bhogal et al. | 707/1 |
| 2005/0203869 A1 | 9/2005 | Minamino | |
| 2005/0216500 A1 | 9/2005 | Edelstein et al. | |
| 2006/0161521 A1 | 7/2006 | Dettinger et al. | |
| 2006/0173804 A1 | 8/2006 | Desai | |
| 2006/0224627 A1 | 10/2006 | Manikutty et al. | |
| 2006/0230063 A1 | 10/2006 | Pollinger | |
| 2006/0235834 A1 | 10/2006 | Blakeley et al. | |
| 2006/0235835 A1 | 10/2006 | Dettinger et al. | |
| 2006/0294081 A1 | 12/2006 | Dettinger et al. | |

OTHER PUBLICATIONS

Frasincar, et a;. "XAL: An Algebra for XML Query Optimization" (2001) Proceedings of the 13th Australian Database Society, 8 pages.

Meijer, et al. "XLinq: XML Programming Refactored (The Return of the Monoids)" http://research.microsoft.com/~emeijer/Papers/XMLRefactored.html last viewed Nov. 17, 2006, 16 pages.

International Search Report and Written Opinion for PCT Patent Application No. PCT/US2008/053095, Jul. 3, 2008, 12 pages.

Meijer, et al., "LINQ: Recording objects, Relations and XML in the .NET Framework" (2006) ACM, 1 Page.

"The LINQ Project .NET Language Integrated Query" (2005) Microsoft Paper, 28 Pages.

"XLing .NET Language Integrated Query for XML Data" (2005) Microsoft Paper, 41 Pages.

Office Action dated May 14, 2009 cited in U.S. Appl. No. 11/671,414.

U.S. Appl. No. 11/671,414, Jul. 20, 2010, Notice of Allowance.

* cited by examiner

COMPOSITIONAL QUERY COMPREHENSIONS

CROSS-REFERENCE TO RELATED APPLICATIONS

This application is related to co-pending U.S. application Ser. No. 11/671414 (MSFTP1549US), filed Feb. 5, 2007, entitled "QUERY PATTERN TO ENABLE TYPE FLOW OF ELEMENT TYPES." The entirety of this application is incorporated herein by reference.

BACKGROUND OF THE INVENTION

In the domain of computer languages that support query operations, there have traditionally been two distinct approaches. According to one approach query comprehensions can be employed and according the an alternative approach method calls to an Application Programming Interface (API) can be utilized. One of the benefits of calling an API directly is that an associated query expression can be more composable in the sense that a user can piece together query clauses and/or small independent queries into larger queries. Unfortunately, one difficulty with using the underlying API in conventional frameworks is that users of this approach are forced to pass in delegates and/or lambda expressions in order to introduce new variables in scope.

In contrast conventional languages with query support that employ comprehensions or query expressions is that the comprehensions can be utilized to introduce a scope for control variables that can potentially span over several clauses of the query. While this can provide for an advantage over using API calls, there exist associated disadvantages to this approach as well. For example, in many languages that support query comprehensions such as Structure Query Language (SQL), XQuery, Haskell, etc., the comprehensions ubiquitously exist as monolithic constructs. Thus, the comprehensions are inherently less composable, and users cannot, e.g., arbitrarily stitch together larger queries from smaller ones Standard varieties of SQL represent primary examples of non-compositional languages that impose many restrictions on how and where queries can be nested inside other queries and how queries can be stacked together. The basic syntax of an SQL query is: Select, From, Where, Groupby, Having, OrderBy, from which the user is largely restricted from introducing additional query operators and/or in different orders. These and other monolithic constructs allow for very little flexibility in, for instance, placing another From clause after the Where clause, or when nesting queries inside the Select clause. Another example is XQuery that utilizes the For, Let, Where, Order By, Return (FLWOR), which suffers from similar shortcomings.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises computer-implemented techniques for evaluating query expressions with query comprehensions constructed in a compositional manner. In accordance therewith, the claimed subject matter can unite various beneficial aspects of two heretofore disparate approaches. Namely, the claimed subject matter can facilitate a more composable query expression that can allow assembly and nesting of query clauses in a modular fashion; and, moreover, the claimed subject matter can further do so with wide scoping rules generally associated with query comprehensions.

To the accomplishment thereof, all or portions of a query comprehension can introduce new control variables, hide existing control variables, and/or use the existing control variables. In accordance with an aspect of the claimed subject matter at any point in a query expression virtually any query operator can be employed, irrespective of the type of the previous query operator or some monolithic syntax template. Moreover, after any given query clause, a query expression can be terminated, whereby the, e.g., compiler or other similar component can insert an implicit Select or Return clause to automatically finish the query expression and output results of the query. It is to be appreciated that format for the results can vary depending on the number of control variables in scope when the implicit clause is appended. For example, if only one control variable is in scope, the underlying values of a collection can be returned. However, if two or more control variables are in scope, the output can be structured as a collection of tuples.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
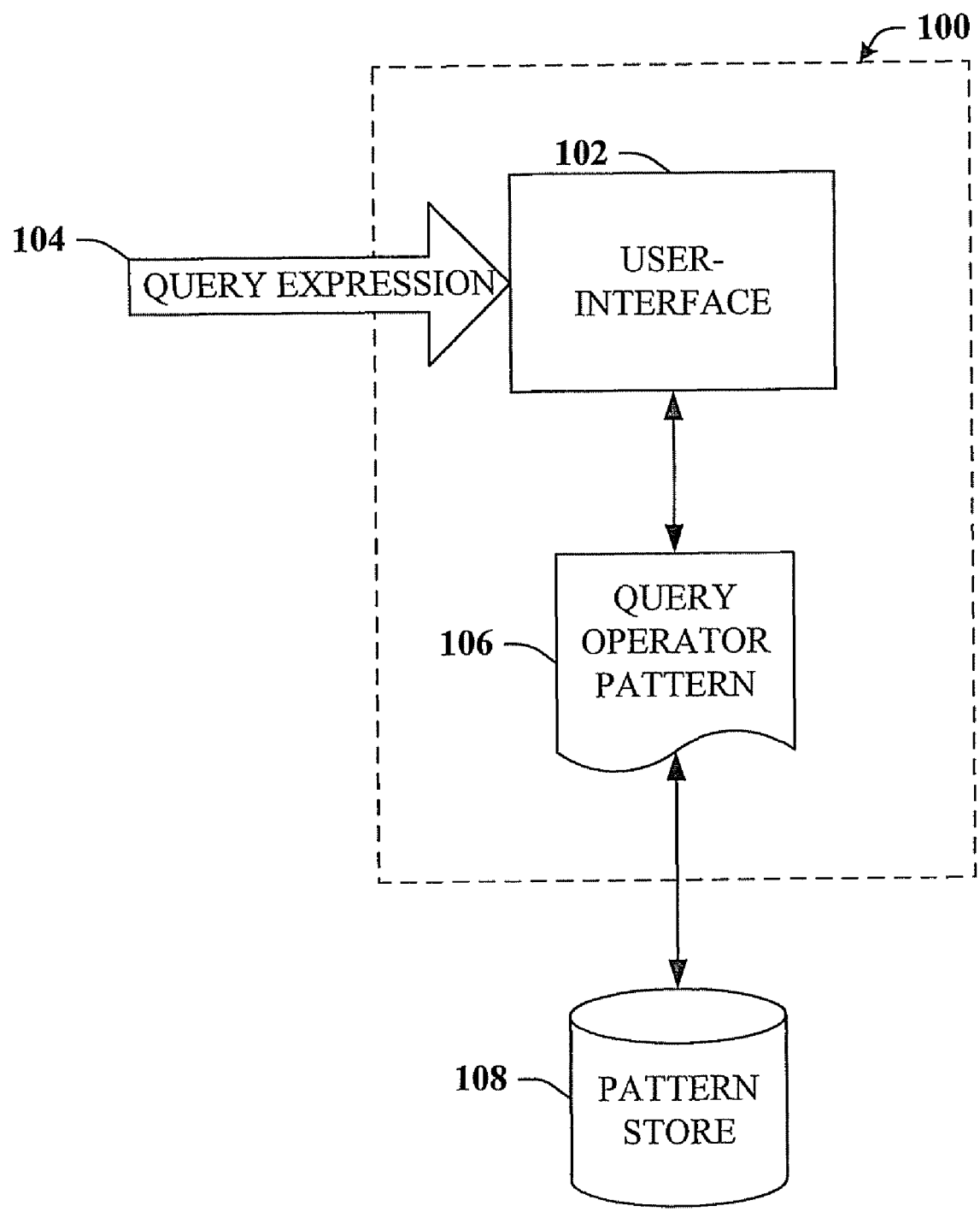
FIG. 1 is a block diagram of a computer-implemented system that can employ a query pattern to facilitate type flow of element types.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, a computer-implemented system 100 that can employ query patterns to facilitate type flow of element types is depicted. Generally, the system 100 can include a user-interface 102 that can be operatively coupled to well-known computer-based hardware (e.g., controllers), software (e.g., applications), as well as other components described herein. The user-interface 102 can receive a query expression 104, which can include a first query clause and one or more next query clause(s). It is to be appreciated that the first query clause can include a queryable source type (e.g., a collection, a stream, etc.) as well as an element type that can be introduced by the first query clause as, for example, a control variable in connection with the source type. Typically, all query clauses include a query operator, however, as will be seen, the next query clauses of the query expression 104 need not be complete, but rather can be received incrementally in portions, such as while the clause is being input by a user. Query expression 104 and related subcomponents are described in more detail infra in connection with FIGS. 2A and 2B.

The system 100 can also include a query operator pattern 106 for any valid query operator (e.g., query operators associated with the first query clause and subsequent next query clauses). Accordingly, any number of query operator patterns 106 can exist in, for example, a pattern store 108 that can be operatively coupled to the system 100. In particular, the query clauses (e.g., each with a specific query operator) from the query expression 104 can conform to associated query operator patterns 106, which can define, e.g., accessible instance methods. By conforming to the query operator pattern 106, it can be substantially guaranteed that there is a known relationship between one query clause and the next query clause, and therefore a relationship from one query operator to the next query operator. The query operator patterns 106 are described in more detail in connection with FIG. 3.

It should be understood that by placing constraints on the query expression 104 such that the operators of the query expression 104 conform to the query operator patterns 106, the system 100 can ensure type flow of element types from one query clause/operator of the query expression 104 to the next query clause/operator. Further, by ensuring that the element types flow as described herein, certain advantageous type inferences and/or contextual determinations can be effectuated on the fly without the need for conventional translation/compilation of the query expression 104, as discussed in more detail with reference to FIG. 4. Moreover, the aforementioned inferences and/or determinations can be provided before the query expression 104 is complete and even when the query expression 104 is malformed. By way of further explanation but not limitation, an example query expression 104 that conforms to the query operator patterns 106 and some of the advantages associated with this schematization are described in more detail below.

Figure 2A:
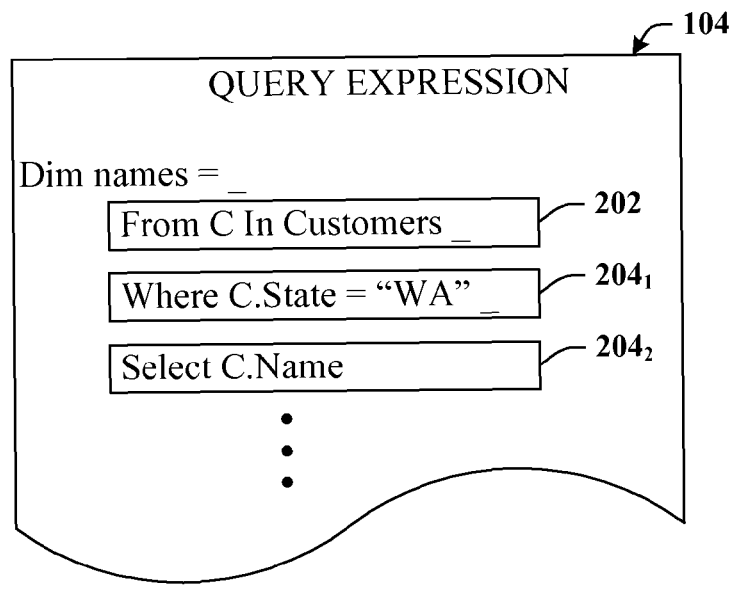
FIG. 2A illustrates a non-limiting representative first query clause and various non-limiting representative next query clauses for an exemplary query expression.

While still referring to FIG. 1, but turning also to FIG. 2A, an exemplary query expression 104 is illustrated. Generally, the query expression 104 can be an expression that applies a series of query operators to a particular collection. A query operator is an operator (e.g., FROM, WHERE, SELECT . . . that can be applied to a collection of values across the entire collection at once. The query expression 104 can include a first query clause 202 and any number of next query clauses 204$_1$, 204$_2$, etc, each of which contains one of the query operators.

While many other query operators can exist and are contemplated to be within the spirit and scope of the claimed subject matter, a number of concrete examples along with a brief description for each are provided infra.

The FROM operator can introduce one or more control variables and either specifies a collection to query or computes a value for the control variable.

The RETURN and the SELECT operators can specify the shape of the output collection. In some cases, the SELECT operator can introduce new control variables.

The WHERE and DISTINCT operators can restrict the values of the collection.

The ORDERBY operator can impose an ordering on the collection.

The SKIP, SKIPWHILE, TAKE, and TAKEWHILE operators can return a subset of a collection based on order or a condition.

The UNION, UNIONALL, EXCEPT, and INTERSECT operators can receive two collections and produce a single collection.

The GROUP operator can aggregate a collection and can return the collection grouped by a key.

The GROUPBY operator can group the collection based on one or more keys. In some cases, the GROUPBY operator can introduce new control variables.

The AVG, SUM, COUNT, MIN, and MAX operators can aggregate a collection and produce a value.

The ANY and ALL operators can aggregate a collection and return a BOOLEAN value based on a condition.

The JOIN operator can receive two collections and can produce a single collection based on matching keys derived from the elements.

The GROUPJOIN operator can perform a grouped join of two collections based on matching keys extracted from the elements.

The translation of query operators in a query expression 104 can take place in the order in which the operators occur in the query expression 104, from left to right. Typically, first query clause 202 of the query expression 104 includes the FROM operator, since the FROM operator introduces a collection to query over. In addition, the last query clause in the query expression 104 generally includes a RETURN and the SELECT operator that specifies the final shape of the collection that results from the query. It is to be appreciated, however, that the final SELECT or RETURN operator can be omitted. For example, if the query expression 104 does not end with a RETURN or SELECT operator, an implicit SELECT operator can be assumed, which can lift all of the control variables in scope to be a property of the returned anonymous type. Furthermore, it should be appreciated that the query expression 104 can continue after a SELECT operator is applied in which case the control variables accessible to subsequent operators can be limited only to those control variables in scope.

In accordance with one aspect of the claimed subject matter, the query expression 104 can be schematized as follows:

```
QueryExpression ::= QueryOperatorList
QueryOperatorList ::=
    FromOperator |
    QueryOperatorList QueryOperator
QueryOperator ::=
    FromOperator |
    SelectOperator |
    ReturnOperator |
    DistinctOperator |
    WhereOperator |
    OrderByOperator |
    PartitionOperator |
    SetOperator |
    GroupByOperator |
    JoinOperator |
    GroupJoinOperator
```

In order to provide additional context for the claimed subject matter as well as a high level overview of related programmatic implementations and/or languages, consider the entirety of the exemplary query expression 104:

```
Dim names = _
    From C In Customers _
    Where C.State = "WA" _
    Select C.Name
```

This query expression 104 can take a collection of Customer objects and return a collection of rows with a single Name property for each of the customers in Washington.

It is readily apparent that the query expression 104 syntax can be reasonably close to standard relational Structure Query Language (SQL) syntax, with the intent that anyone familiar with SQL will be able to use query expressions 104 with very little further instruction. The syntax need not, however, be constrained by SQL, and, further, the query expressions 104 need not be a translation of SQL into another programming language. Because SQL was designed around a purely relational model, some of its idioms do not work as well in a type system that embraces notions of hierarchy. Additionally, some of the syntactic and semantics elements often employed by SQL conflict or do not integrate well with existing programming language syntax or semantics. Thus, while query expressions 104 can be intuitive to a user familiar with SQL, there can also be some distinctions.

For example, in SQL and in other languages such as Procedural Language/Structured Query Language (PLSQL) queries and the results of the queries are bound by evaluating the entirety of the query. As such, there is no need to be able to interpret the element type for specific query operators that are applied. Moreover, such a determination cannot be made until the entire, error-free query is input and bound by relatively expensive translation process. In contrast, the claimed subject matter can provide for binding query expression 104 input and the results of the query expression 104 in terms of individual query operations over a particular source type. These and other advantages can be illustrated in greater depth with reference to FIG. 2B.

Figure 2B:
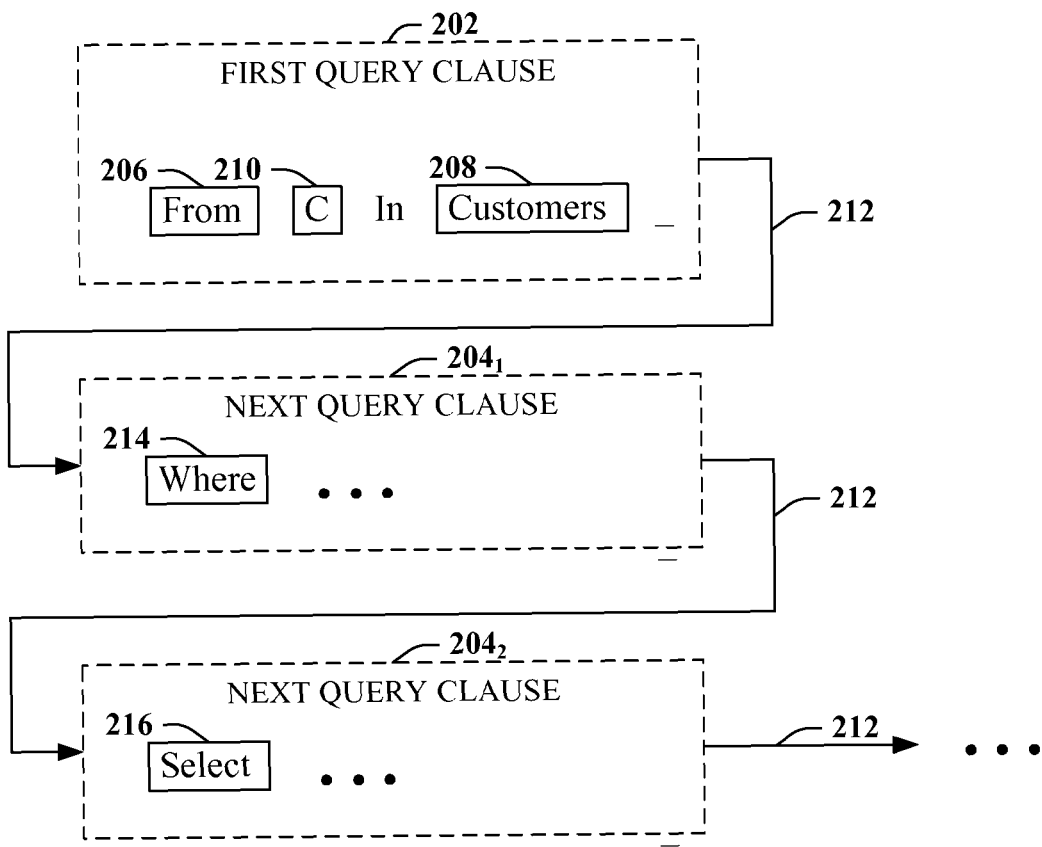
FIG. 2B illustrates in more detail the query clauses of the exemplary query expression as well as a type flow of an element type.

FIG. 2B illustrates in more detail the query clauses of exemplary query expression 104. In this example, the first query clause 202 includes a first query operator (e.g., the FROM operator 206), which can serve to introduce a queryable source type (e.g., Customers 208), and can declare a control variable 210 (e.g., C) for the element type of the source type. As depicted, the result of the first query clause 202 flows 212 to the next query clause $204_1$ (referred to collectively herein as next query clauses 204) such that a known relationship can exist between adjacent query clauses. In particular, the element type can flow 212 to the next query operator (e.g., WHERE operator 214) to serve as a source type for the next query clause $204_1$. Likewise, the output of the next query clause $204_1$ flows 212 to the next query clause $204_2$ where it is associated with the next query operator (e.g., SELECT operator 216), which can also produce an element type that flows 212 to subsequent next query clauses 204 or describes the final shape for the output of the query expression 104.

In particular, query operations for each of the next query clauses 204 can be based upon a set of methods (e.g., query operator pattern 106), each associated with a particular query operator, and which are applied to a collection or sequence (e.g., the source type). These query operators can be defined in relation to the element type (or row) of the collection. However, given a particular source type with an element type of T and the application of a query operator, the result that flows 212 to a next query operator 204 can be a collection with an element type of S. Hence, the element types that flow 212 can be transformed in accordance with the query operator patterns 106 associated with a given query operator. For example, query operator patterns 106 associated with projection query operators such as SELECT and RETURN generally return a different element type than the element type that received from the flow 212.

In the present example, an element type, T, (that can be, e.g., an aggregation of all the control variables 210 associated with the Customer type 208) flows 212 to the WHERE operator 214 of the next query clause $204_1$. As will be described in connection with FIG. 3, the query operator pattern 106 associated with the WHERE operator 214 can filter the values of the collection, but otherwise does not typically change the element type. Here, Customers not in the state of Washington are filtered from the collection, but the results that flow 212 to the next query operator, the SELECT operator 216, are still a collection with an element type of Customer 208.

On the other hand, if it is assumed that the Name property is of type String, the results of the SELECT operator 216 is a collection with an element type of String. The combination of supporting both the SELECT and RETURN operators for query results can provide predictable semantics of the inputs and outputs to the operators. In addition, more flexibility can be facilitated to closely mimic expected SQL semantics when interacting with relational data. Further, greater simplicity can be facilitated when producing non-tabular results, as well as improved locality of compiler errors and required changes when iteratively developing a query expression.

Additionally, as with certain query languages that can query collections of eXtensible Markup Language (XML) data (e.g., XQuery, which is a query language that includes some programming language features); the claimed subject matter can also be employed in conjunction with XML literals. For example, the following exemplary query expression 104 can be employed to return a collection of XML elements that include the names of all customers in Washington, similar to the results of the exemplary query expression 104 discussed above.

```
Dim names =_
    From c In Customers_
    Where c.State = "WA"_
    Return <Name><%= c.Name %></Name>
```

It is to be further appreciated that some query operators such as, e.g., FROM, SELECT, and GROUPBY, can introduce a special kind of local variable called a control variable (e.g., control variable C 210). By default, a control variable can be scoped from the introducing operator to an operator that can hide the control variable and can represent a property or column of the individual row in a collection as the query evaluates. For example, in the following query:

```
Dim WACusts =_
    From C As Customer In Customers_
    Where C.State = "WA"
```

The FROM operator introduces a control variable C typed as Customers. The following WHERE query operator then refers to the control variable C to represent each individual customer in the filter expression C.State="WA".

Some query operators, such as DISTINCT, need not use or change the control variables. Other query operators such as SELECT can hide the current control variables in scope and can introduce new control variables. For example, in the query:

```
Dim YourUncles =_
    From C In Customers_
    Select LastName = C.Name_
    Where LastName.StartsWith("Bo")
``` the WHERE query operator only has access to the LastName control variable introduced by the SELECT operator. If the WHERE operator had tried to reference C, a compile-time error might be a likely result.

Figure 3:
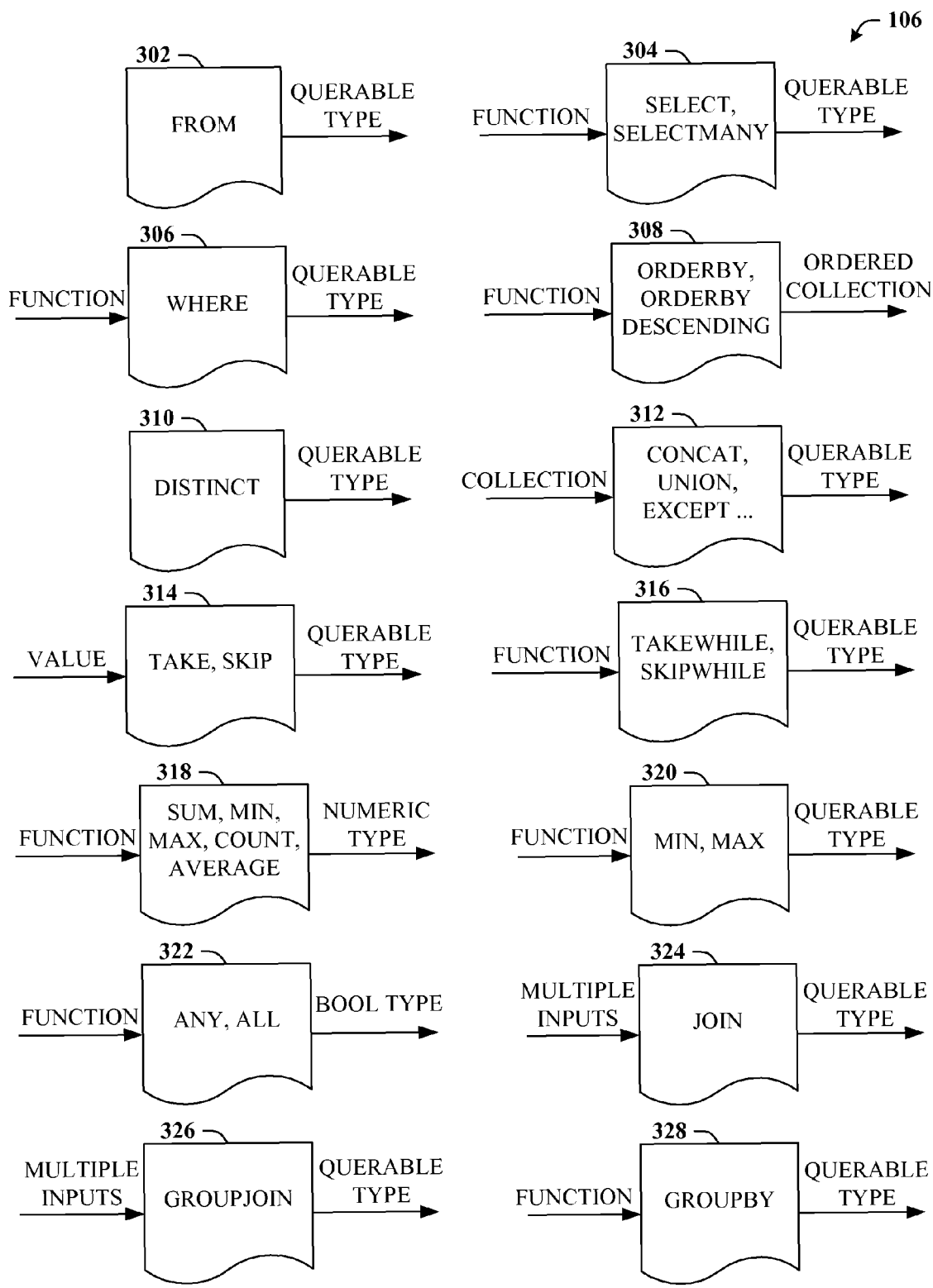
FIG. 3 depicts various non-limiting examples of query operator patterns with exemplary inputs and outputs.

With reference now to FIG. 3 (while still referring to FIG. 1), numerous non-limiting examples of query operator patterns are provided. The query operator patterns 302-328 are concrete illustrations of the query operator pattern 106, and can be referred to herein individually by reference numerals 302-328 or collectively as query operator patterns 106. It is to be further appreciated that several of the query operator patterns 106 can be applicable to a plurality of query operators even though each of the plurality of query operators that relate to a single one of the query operator patterns 302-328 can have characteristics that distinguish it from others of the plurality of query operators. Moreover, in some cases a particular query operator can be employed in connection with more than one of the query operator patterns 302-328 (e.g., overloading functions).

In general, the query operator pattern 106 can be a method signature that a type, C, has to implement in order to be queryable. Recall that the query expression 104 can apply a series of query operators to a particular collection. The control variables of each of the query operators can be all or a subset of all variables in scope for the application of that particular query operator, whereas the element type, T, which can flow from one query operator to the next query operator, can be an anonymous type that is an aggregation of all the control variables in scope. Hence, the query operator pattern 106 can, inter alia, help ensure that a type C is a queryable type. For any given query expression 104, a type, C, is a queryable type if at least one of the following is true:

(1) Type, C includes an accessible instance method with the signature AsQuerable( ) that returns a queryable type.
(2) Type, C, includes an accessible instance method with the signature AsEnumerable( ) that returns IEnumerable (Of T).
(3) Type, C, implements one or more query operators that conform to the query operator patterns 302-328 (further detailed infra), and for all query operators defined on type, C, the type, T, must match and must not be an open type parameter.

With reference to the query operator patterns 302-328, query operator pattern 302 can include the FROM operator. Within a query expression 104 the FROM operator is typically employed in the first query clause. As such, the FROM pattern 302 can introduce the source of a query as well as the control variable to be used, and can output a queryable type with element type, T. It should be understood that prior to evaluation of the query expression, if the type of C does not satisfy the design pattern (e.g., does not conform to query operator pattern 106), then the AsQueryable or AsEnumerable method can be invoked on the query expression 104 and the return value of the function can be stored in a temporary location.

As recited above, the FROM operator can introduce a collection that can be queried and a control variable that can represent the individual members of the collection. The query expression:

```
           From b As Book In Books . . .
    can be thought of as equivalent to
           For Each b As Book In Books
                    . . .
           Next b
```

The collection expression operand generally must be classified as a value and must be a queryable type. The control variable declared by the FROM operator typically must follow the regular rules for declaring local variables with respect to naming and scoping (as implied by the above syntax translation). Thus, a control variable normally cannot hide the name of a local variable or parameter in the enclosing method.

It should be understood that a FROM operator can also introduce a control variable whose value can be determined by an expression rather than by a collection. Such a feature can be useful to, e.g., calculate a value that will be used multiple times in later query operators (e.g., calculate the value once rather than each time it is used subsequently). For example:

```
           Dim TaxedBookPrices =_
              From b in Books_
              From Tax = b.Price * 0.088_
              Where Tax > 3.50_
              Select b.Price, Tax, Total = b.Price + Tax
```

```
    can be thought of as equivalent to:
           For Each b in Books
                    Dim Tax = b.Price * 0.088
                    . . .
           Next b
```

The syntax of the FROM operator that declares an expression control variable can be the same as a control variable declaration in a FOR LOOP, with the exception that the control variable is generally initialized through an explicit initializer. An expression control variable is not required to reference another control variable, since doing so may be of dubious value. An expression control variable usually cannot be the first control variable declared in the query expression 104.

For the sake of brevity and/or convenience, the operand of the FROM operator can omit the AS clause, in which case the type of the control variable can be inferred from the collection or expression over which the variable ranges. If the type of the control variable cannot be derived from the query operator methods, a compile-time error will result. The FROM operator can be schematically defined as follows:

```
FromOperator ::=
       From FromDeclarationList
FromDeclarationList ::=
       FromDeclaration |
       FromDeclarationList , FromDeclaration
FromDeclaration ::=
       VariableIdentifier [As TypeName ] In Expression |
       VariableDeclarator
```

Additionally, while the FROM operator generally appears as the query operator for the first query clause 202, a query expression 104 can include more than one FROM operator. Accordingly, when a FROM operator is the query operator for a next query clause 204, then a cross-product (e.g., simple, implicit join) can result. In this case, the FROM operator can join (see JOIN operator pattern 324, infra) new control variable to the existing set of control variables. The result can be the cross-product of all the elements in the joined collections. So, for example, the expression

```
           From b In Books_
           From p In Publishers_
                    . . .
    can be thought of as equivalent to the nested For Each loop
           For Each b In Books
                    For Each p In Publishers
                             . . .
                    Next p
           Next b
```

The control variables introduced in previous query operators can be in scope and can be used within a FROM operator that included in a next query operator 204. In terms of SQL, the aforementioned features can be thought of as supporting "correlated subqueries". For example, in the following query expression, the second FROM operator refers to the value of the first control variable:

```
From c As Customer In Customers_
From o As Order In c.Orders_
Select c.Name, o
```

In addition, multiple FROM operators can appear in a single query clause, in which case a comma between operands can be exactly equivalent to another FROM operator in a next query clause 204. Thus, the example:

```
From b In Books, p In Publishers_
Select b, p
can be equivalent to
From b In Books_
From p In Publishers_
Select b, p
```

Query operator pattern 304 can include a query operator that is an accessible instance method named SELECT or SELECTMANY, which can receive a function as an argument. The function can include an argument of type, T, and results in a type, S. The method can return a queryable type with element type, S.

The SELECT operator can describe the results of the query expression 104. The SELECT operator can take a list of declarations and construct an element type of the resulting collection. For example, if the query expression 104 is:

```
Dim CustAndOrderNames =_
From c In Customers, o In c.Orders_
Select c.Name, o.Product
``` then the result type can be IEnumerable(Of {Name As String, Product As String}) since Name is of type String and Product is of type String.

This query (e.g., query expression 104) that follows can be equivalent to explicitly returning an anonymous type:

```
Dim CustAndOrders =_
From c In Customers, o In c.Orders_
Return New With { c.Name, o.Product }
```

If the SELECT operator has only one declaration, the result can be an anonymous type with one property. As such the result type can be Ienumerable (Of {Name As String}) since Name is of type String. For example,

```
Dim CustNames =_
From c In Customers
Select c.Name
```

The expressions within the declarations used within a SELECT operator are bound before the conversion to the underlying anonymous type. More specifically, expressions within the declarations in a SELECT operator can begin a member access in which the dot operator need not bind to the control variables in the query. Rather, the dot operator can instead bind to an enclosing WITH block if one is present.

It should be appreciated that in addition to the SELECT operator, the query expression 104 can also include other projection operators. For example, the query expression can include a RETURN operator with which there can be an associated query operator pattern 106. Similar to the SELECT operator, the RETURN operator can describe the result of the query expression 104. The RETURN operator can take an expression which produces the elements of the resulting collection. For example, the query:

```
Dim ReducedBookPrices =_
From b in Books_
Return b.Price * .8
``` can result in a collection of prices that have been reduced to 80% of their original cost.

The result of a query expression 104 that ends with a RETURN operator can be a collection whose element type is the type of the returned expression. For example, in the following query expression the result type is IEnumerable (OF String), since c.Name is of type String:

```
Dim CustNames = _
From c In Customers _
Return c.Name
```

If a query expression 104 ends without a RETURN or SELECT operator, the resulting element type of the collection can be an anonymous type with properties for all of the control variables in scope:

```
' Result type is IEnumerable(Of {Name As String, Product As String})
Dim CustNames = _
From c In Customers, O In C.Orders
```

Even though a SELECT operator can describe the results of a query expression 104, any query expression 104 can continue after a SELECT operator. In that case, the control variables introduced by the SELECT statement are the control variables in scope, but all previous control variables are typically out of scope:

```
CustNames = _
From c In Customers, O In C.Orders _
Select Name = C.Name, Price = O.Price
Where Price > 500
Return Name
```

A query expression 104 that continues after a SELECT operator can be equivalent to a nested query:

```
Dim CustNames = _
From X In (From c In Customers, O In C.Orders _
Return New With { C.Name, O.Price }), _
Name = X.Name, Price = X.Price
Where Price > 500
Return Name
```

The RETURN and SELECT operators, respectively, can be defined based upon the following example:

```
ReturnOperator ::=
    Return Expression
SelectOperator ::= Select SelectDeclarationList
SelectDeclarationList ::=
    SelectDeclaration |
    SelectDeclarationList , SelectDeclaration
SelectDeclaration ::=
    VariableDeclarator
```

Query operator pattern 306 can include a query operator that is an accessible instance method named WHERE that takes as an argument a function. A type, T, can be an argument of the function and results can be in a type that can be implicitly convertible to a boolean type. For example, the results type may have the same rules as the type of an expression that can be used in an IF, WHILE, or DO statement. Hence, the type may have either an implicit conversion to Boolean types or the IsTrue and IsFalse operators may need to have been defined. The WHERE operator can return a queryable type with element type T.

The WHERE operator can restrict the values in a collection to those that satisfy a given condition. A WHERE operator can receive a Boolean expression that is evaluated for each set of control variable values. If the value of the expression is True, then the values can appear in the output collection, otherwise the values can be skipped. The query expression:

```
From b In Books, p In Publishers _
    Where b.PublisherID = p.PublisherID _
    ...
can be thought of as equivalent to the nested loop
    For Each b In Books
        For Each p In Publishers
            If b.PublisherID = p.PublisherID Then
                ...
            End If
        Next p
    Next b
```

The WHERE operator can be defined as:

```
WhereOperator::=Where BooleanExpression
```

Query operator pattern 308 can include a query operator that is an accessible instance method named ORDERBY or ORDERBYDESCENDING that can take as an argument a function, which in turn can take in an argument of type, T, and results in a type, S. The method associated with pattern 308 can return an ordered collection with element type, T.

The ORDERBY operator can order the values that appear in the control variables based upon an order. The ORDERBY operator can take an expression that specifies the value that should be used to order the control variables. For example, the following query returns book titles sorted by price:

```
From book In Books _
    Order By book.Price
    Select book.Title
```

The ordering can be ascending, in which case smaller values come before larger values, or descending, in which case larger values come before smaller values. The default for an ordering is ascending. For example, the following query returns book titles sorted by price with the most expensive book first:

```
From book In Books _
    Order By book.Price Descending
    Select book.Title
```

The ORDERBY operator may also specify multiple expressions for ordering, in which case the collection can be ordered in a nested manner. For example, the following query expression orders authors by state, then by city within each state, and then by ZIP code within each city:

```
From author In Authors _
    Order By author.State, author.City, author.ZIP _
    Select author.Name, author.State, author.City, author.ZIP
```

The ORDERBY operator can be schematized based upon the following example:

```
OrderByOperator ::= Order By OrderExpressionList
OrderExpressionList ::=
    OrderExpression |
    OrderExpressionList , OrderExpression
OrderExpression ::=
    Expression [ Ordering ]
Ordering ::= Ascending | Descending
```

In addition, query operator pattern 310 can include a query operator that is an accessible instance method named DISTINCT. Typically, the method does not require an input and can return a queryable type with the same element type as the source type, C. The DISTINCT operator can restrict the values in a collection to only those with distinct values (e.g., does not return repeated values). For example, the query:

```
From c In Customers, o In c.Orders _
    Select c.Name, o.Price _
    Distinct
``` will only return one row for each distinct pairing of customer name and order price, even if the customer has multiple orders with the same price. The DISTINCT operator can be schematized as:

```
DistinctOperator::=Distinct
```

Referring now to query operator pattern 312, the pattern 312 can include a query operator that is an accessible instance method named CONCAT, UNION, INTERSECT, or EXCEPT. The method can receive as an argument a collection with the same element type, T, as the source, C, and can return a queryable type with element type, T.

The next query operator pattern, pattern 314 can include a query operator that can be an accessible instance method named TAKE or SKIP, which can receive a value as an argument, and which can return a queryable type with the same element type as the source type, C.

The TAKE operator can result in a given number of elements from a collection. When used with the WHILE modifier (see e.g., query operator pattern 316), the TAKE operator can result in a sequence of elements while the condition holds true.

The SKIP operator can ignore a given number of elements from a collection and then returns the remainder of the collection. When used in conjunction with the WHILE modifier, the SKIP operator skips elements while a condition holds true and then returns the rest of the collection. An example schema for TAKE and SKIP are provided below.

```
PartitionOperator ::=
    TakeExpression |
    SkipExpression
TakeExpression ::=
    Take   [ While ] Expression |
SkipExpression ::=
    Skip   [ While ] Expression
```

Query operator pattern 316 can include a query operator that is an accessible instance method named TAKEWHILE or SKIPWHILE. The method can take as an argument a function, wherein the function can receive an argument of type, T, and results in a Boolean. The method can return a queryable type with element type T.

Query operator pattern 318 can include a query operator that is an accessible instance method named SUM, MIN, MAX, COUNT, or AVERAGE. The method can receive as an argument a function, which in turn receives an argument of type, T, and results in a numeric type. The method can return a numeric type.

Query operator pattern 320 can include a query operator that is an accessible instance method named MIN or MAX that can take as an argument a function with an argument of type, T, and results in a type, S. The method can return a queryable type with element type, S.

Query operator pattern 322 can include a query operator that is an accessible instance method named ANY or ALL that can receive as an argument a function. The function can include an argument of type, T, and results in a type that can be implicitly convertible to Boolean. The method can return a type that can be implicitly convertible to Boolean.

It is to be understood that the query operators associated with patterns 318-322 can be employed in conjunction with an AGGREGATE operator. Within an Aggregate query clause, the set of standard AGGREGATE operators can be applied to the grouped control variable in scope. The AGGREGATE operators can include but are not limited to: ANY, ALL, COUNT, LONGCOUNT, SUM, MIN, MAX, AVERAGE, and/or GROUP.

The ANY aggregate operator can ascertain whether there is an element in the group that satisfies a given condition. The ALL aggregate operator can determine whether all elements in the group satisfy a given condition. For example, the example query expression 104 below can check whether there are any customers younger than 18 years old:

```
From cust In Customers _
Group By cust.State _
Aggregate YoungerThan18 = Any(cust.Age < 18)
``` whereas the following example query expression 104 can return all customers in a given state who have at least 5 orders:

```
From cust In Customers _
Group By cust.State _
Aggregate AtLeast5 = All(cust.Orders.Count( ) > 5)
```

The COUNT and LONGCOUNT aggregate operators can take an optional Boolean expression and count the number of elements in the group that satisfy the given condition.

```
From cust In Customers _
Group By cust.State _
Aggregate Seniors = Count(cust.Age > 50)
```

The SUM aggregate operator can compute the sum of the elements of a group based on a particular selector expression. For example, the following exemplary query expression 104 can compute the total values of all orders grouped by category:

```
From order In Orders _
Group By order.Category
Aggregate Total = Sum(order.Price)
```

The MIN and MAX aggregate operators can calculate the minimum (or maximum) of the elements of a group based on some selector expression. For example, the following example query expression 104 can compute the youngest and the oldest customer for each state:

```
From cust In Customers _
Group By cust.State
Aggregate Oldest = Max(cust.Age), Youngest = Min(cust.Age)
```

The AVERAGE aggregate operator typically computes the average of the elements of a group based on a particular selector expression. For example, the following example query expression 104 can compute the average price for all products grouped per category:

```
From prod In Products _
Group By prod.Category
Aggregate AveragePrice = Average(prod.Price)
```

The special GROUP aggregate operator can accumulate all the elements of the group, based on an optional selector expression, into an explicit collection. For example, the following exemplary query expression 104 can collect all the names of customers in a given state into a single collection.

```
From cust In Customers _
Group By cust.State
Aggregate Names = Group(cust.Name)
```

Query operator pattern 324 can include a query operator that is an accessible instance method named JOIN. The method can that take as an argument a queryable type, S, with an element of type T'; a function that acts as the inner selector which can take an argument of type, T, and results of a type representing a key, K; a function that acts as the outer selector that can take an argument of type, T', and results in a type representing the key, K; and/or a function that acts as the join condition which takes two arguments of type T and T', respectively and results in a hash value of type, V. The method can return a queryable type with an element type, V.

Hence, the JOIN operator can take two collections and produce a single collection based on matching keys derived from the elements. Some restrictions can apply when specifying the condition on which to join. For example, the operands to the conditional expression may be required to be implicitly convertible to Boolean. One example of a JOIN schema follows.

```
JoinOperator ::=
    Join LoopControlVariable [As TypeName ] In Expression Where
JoinConditionExpression
JoinConditionExpression ::=
    RelationalOperatorExpression |
    LikeOperatorExpression
```

Query operator pattern 326 can include a query operator that is an accessible instance method named GROUPJOIN that can receive as an argument a queryable type, S, with an element of type, T'; a function that acts as the outer key selector that takes an argument of type, T, and results in a type representing the key, K; a function which acts as the inner key selector which takes an argument of type, U, and results in a type representing the key, K; and/or a function that can yield the results, wherein the function can take an argument of type, T, and an argument that is a collection with an element type, U, that results in a selected type, V. The method can return a queryable type with element type, V.

The GROUPJOIN operator can create a grouped join of two collections based on matching keys extracted from the elements. The operator can produce hierarchical results (e.g., outer elements paired with collections of matching inner elements) and requires no direct equivalence in relational database terms. The following example query expression 104 can perform a grouped join of customers with their orders, producing a collection of anonymous types with the customer name and the total of that customer's orders:

```
From cust In db.Customers _
    Group Join order In db.Orders On cust.ID = order.CustID _
    Aggregate TotalOrders = Sum(order.Total) _
    Select cust.Name, TotalOrders
```

There can be any number of additional operators that operate on fixed sets to compute single values. In the context of a query, one can say that these operators aggregate computed values. To aggregate over a set, the set must generally first be introduced. Within a query, there can be various ways to specify a collection for aggregate computation. After a group is introduced, that group can be aggregated over to compute single values. Hence, in addition to the grouping operators GROUPJOIN (as well as GROUPBY discussed in connection with query operator pattern 328, below), other grouping operators can exist. One such example is the OVER operator.

The OVER operator can specify that a group should be accumulated for aggregate comprehension. The Over operator can be used as a stand-alone expression or it can be used to specify that a pre-formed collection should be employed for aggregate computation. For example, the following example query expression 104 can aggregate the sum of all the order totals before Jan. 1, 2006:

```
Over order In Orders _
    Where order.Date <= #01/01/2006# _
    Aggregate Sum(order.Total)
```

Each application of the OVER operator typically must be closed by a corresponding AGGREGATE operator to compute a single value based on the contents of the collection. The result of the query can be a single value which corresponds to the aggregate computation, which in this case is an Integer that represents the sum total of all the orders before 2006.

Between the OVER and AGGREGATE operators potentially any query operator can be used. Within the AGGREGATE operator, only AGGREGATE operators (e.g., operators associated with patterns 318-322, described supra) may be used on the control variables specified by the previous OVER operator.

When a set is already formed, as is often the case with hierarchical object graphs, the OVER operator can be used to specify that a set should be used for aggregate computation. For example, the following exemplary query expression 104 can aggregate the sum total of all the orders placed by customers in Washington before 2006:

```
From cust In db.Customers _
    Where cust.State = "WA" _
    Over order In Orders _
    Where order.Date <= #01/01/2006# _
    Aggregate Sum(order.Total)
```

The result of the query can be a queryable type whose element type is an anonymous type with two properties: 1) a Customer property called cust and an Integer property called Sum.

Query operator pattern 328 can include a query operator that is an accessible instance method named GROUPBY that takes as an argument a function that acts as the key selector receiving an argument of type, T, and results in a type representing the key, K; and/or a function that yields the result, which takes an argument of type, K, and an argument that is a collection with an element type, T, that results in a selected type, V. The method can return results in a queryable type with element type, V.

The GROUPBY operator can group (e.g., logically) the elements of a collection based on one or more common key expressions. For each of these partitions of the initial collection, a subsequent AGGREGATE statement can specify how each of these groups is aggregated into a single value or row.

For example, the following exemplary query expression 104 can group all customers by State, and then compute the count and average age of each group:

```
From cust In Customers _
    Group By cust.State
    Aggregate Total = Count( ), AverageAge = Avg(cust.Age)
```

Like the SELECT operator, the GROUPBY operator can bring the variables declared in the key selectors in scope as control variables and can hide all control variables that were previously in scope. In contrast, unlike the certain aspects of the SELECT operator, these hidden control variables can be brought in scope again by AGGREGATE operators used inside a subsequent AGGREGATE operator. Furthermore, unlike some implementations of the OVER operator, no other query operators can be used between the GROUPBY and the AGGREGATE operators.

```
From cust In Customers _
    Group CustomersByState By cust.State
```

This construct can be equivalent to constructing the group by way of an explicit aggregation, but can be useful when terminating the query immediately after a GROUPBY operator clause. Thus, the above expression can be equivalent to the expression:

```
From cust In Customers _
    Group By cust.State _
    Aggregate CustomersByState = Group(cust)
```

The actual implementation of the GROUPBY operator need not be required to actually build a representation of each individual group. Instead the implementation may use an underlying implementation that combines the grouping with the subsequent aggregation into a single operation.

It is to be appreciated that the type and name of the control variables can be inferred from the target of the query expression 104 and the query operator being applied (which is discussed in more detail, below in connection with FIG. 4). As such, the element type (which is an aggregation of the control variables in scope), can be inferred in a similar manner. For each of the rules supra, the inferred type of the element type can be T, and the element type typically must match the element type, T, when the queryable type, C, is the collection used in, e.g., a FOR EACH . . . NEXT statement.

It should be further appreciated that an ordered collection can be defined as a collection that implements a subset of the following operators: an accessible instance method named THENBY or THENBYDESCENDING that takes as an argument a function, which takes in an argument of type, T, and results in a type, S. The method can return an ordered collection with element type, T.

Since the query operator patterns 106 can facilitate binding query syntax to methods that implement a particular query operation, order preservation need not be dictated by the underlying language employed. Rather, order preservation can be determined by the implementation of the operator itself. This can be similar to user-defined operators in that the implementation to overload, e.g., the addition operator for a user-defined numeric type may not perform anything resembling an addition. However, to preserve predictability inherent in the claimed subject matter, implementing an operator that does not match user expectations may not be a recommended course.

To aid in a more complete understanding of the claimed subject matter, additional features, aspects and/or implementations can now be further discussed. For example, some of the sections below detail exemplary manners in which each query operator maps to calls to standard query operator methods. Other sections describe ways in which element type information flows as was introduced above and will be employed in later sections (e.g., in connection with FIG. 4 and the associated description infra).

Query Operator Translation

It is to be understood that each of the various query operators can map directly to method calls that can be defined according to a standard query operator pattern (e.g., query operator pattern 106). Thus, the meaning of a query operator (or a query expression as whole) can be expressed in terms of the query operator methods that are to be called. The methods can be instance methods of the object being queried or extension methods that are external to the object. For example, the query:

```
Dim names = _
    From c In Customers _
    Where c.State = "WA" _
    Return c.Name
can be equivalent to:
    Dim names = Customers.Where(c -32 > c.State).Select
    (c => c.Name)
```

Composite Control Variables

While control variables can be employed by the claimed subject matter for various purposes described herein, it is to be appreciated that control variable are not generally directly accessible to an end-user. Some query operators such as WHERE or SELECT take expressions that can refer to control variables that are in scope in the query. These expressions are expressed as local functions that take the control variable and return the result of the expression. For example, the query:

```
Dim WACusts = _
    From cust In Customers _
    Where cust.State = "WA"
can be equivalent to:
    Dim WACusts = Customer.Where(c => c.State ="WA")_
    .Select(c => New With {c.Name})
``` where the control variable cust is used as the parameter for the lambda expression. Similarly, in the case where multiple control variables are in scope, the control variables typically must be grouped together into a single anonymous type so that they can be passed into the local function. For example, the query:

```
Dim WACustsAndOrders =
    From cust In Customers_
    From order In cust.Orders_
    Where cust.State = "WA" AndAlso order.Price > 10.50
can be equivalent to:
    Function Filter1(it As {c As Customer, o As Order}) As Boolean
        Return it.c.State = "WA" AndAlso it.o.Price > 10.50
    End Function
    Function Join1(c As Customer) As_
            IEnumerable(Of {c As Customer, o As Order})
        Function Select1(o As Order) As {c As Customer, o As Order}
            Return New {c, o}
        End Function
        Return c.Orders. Select(AddressOf Select1)
    End Function
    Dim WACustsAndOrders =_
        Customers.SelectMany(AddressOf Join1).Where(AddressOf
        Filter1)
``` where the control variables c and o are combined together into a composite control variable called IT whose type is the anonymous type {c As Customer, o As Order}.

It is to be further appreciated that support for Lambda Expressions can be provided as well and is to be considered within the spirit and scope of the claimed subject matter. As a further note, composite control variables are usually not nested. As an example:

```
From b In Books_
From ba In BookAuthors_
From a In Authors_
...
can be equivalent to:
    Function Join1(b As Book) As IEnumerable(Of {b As Book, ba As
    BookAuthor})
        Function Select1(ba As BookAuthor) As {b As Book, ba As
        BookAuthor}
            Return New { b, ba }
        End Function
        Return BookAuthors.Select(AddressOf Select1)
    End Function
    Function Join2(it As {b As Book, ba As BookAuthor}) As_
        IEnumerable(Of {b As Book, ba As BookAuthor, a As
        Author})
        Function Select2(a As Author) As_
            {b As Book, ba As BookAuthor, a As Author}
            Return New {b, ba, a}
        End Function
        Return Authors.Select(AddressOf Join2)
    End Function
    Books.SelectMany(AddressOf Join1).SelectMany(AddresOf Join2)
```

FROM Operator Translation

A standard FROM operator generally only introduces the source of a query and the control variable to be used. In essence, it does not translate into any specific query operator call. In the case of a JOIN, the FROM operators can be translated into a call to the SELECTMANY query operator method when joining with a regular control variable and a call to the SELECT query operator method when joining with an expression control variable. So the query expression:

```
From b In Books, p In Publishers_
    Select b.Title, p.Name
can be equivalent to:
    Function Join1(b As Book) As IEnumerable(Of {b As Book,
    p As Publisher})
        Function Select2(p As Publisher) As {b As Book,
        p As Publisher}
            Return New With {b, p}
        End Function
        Return Publishers.Select(AddressOf Select2)
    End Function
    Function Select1(it As {b As Book, p As Publisher}) As_
        {Title As String, Name As String}
        Return New With {it.b.Title, it.p.Name}
    End Function
    Books.SelectMany(AddressOf Join1).Select(AddressOf Select1)
``` and the query expression:

```
From b In Books, Tax = b.Price * 0.088_
    Select b.Title, Tax
can be equivalent to:
    Function Select1(b As Book) As {b As Book, Tax As Double}
        Return New With {b, Tax =b.Price * 0.088}
```

-continued

```
    End Function
    Function Select2(it As {b As Book, Tax As Double})
    As {Title As String, Tax As Double}
        Return New With {it.b.Title, it.Tax}
    End Function
    Books.Select(AddressOf Select1).Select(AddressOf Select2)
```

Each query operator can be bound to an underlying method on the source type that adheres to a particular pattern. This pattern dictates the element type of the result of the operator and, in some cases, puts constraints on the expressions that can be passed into the underlying methods.

Explicitly Typed Control Variables

If the FROM operator specifies a target type Object for the control variable using an As clause and the type for T cannot be inferred from the source type, then the element type can be converted using the Cast (Of Object) operator. The query expression:

```
Dim nums =_
    From addrNum As Object In publisher.Address_
    Where addrNum < 5
is equivalent to:
Function Filter1(addrNum As Integer) As Boolean
    Return addrNum < 5
End Function
Dim names = publisher.Address.Cast(Of Object)( ).Where(AddressOf
Filter1)
```

If the FROM operator specifies a target type T (not Object) for the control variable using an As clause and the type for T cannot be inferred from the source type or if the target type does not match the element type of the source, then the element type can be converted using the Cast query operator to Object and a subsequent SELECT operator can be utilized to obtain the target type. For example, the query expression:

```
Dim nums = _
    From addrNum As Integer In publisher.Address _
    Where addrNum < 5
is equivalent to:
Function Filter1(addrNum As Integer) As Boolean
    Return addrNum < 5
End Function
Function Select1(addrNum As Integer) As String
    Return addrNum
End Function
Dim names = publisher.Address.Cast(Of Object)( ).Select(AddressOf
Select1).Where(AddressOf Filter1)
```

If the FROM operator specifies a target type T for the control variable using an As clause and the type for T matches the element type of the source, then there need be no subsequent application of the Cast or SELECT operators.

WHERE Operator Translation

The WHERE operator can be translated to a call to the Where query operator method. For example the query expression:

```
From book In Books_
    Where book.PublisherID = 10_
```

-continued

```
    Return book.Title
can be equivalent to:
    Books.Where(b => b.PublisherID = 10).Select(b => b.Title)
```

ORDERBY Operator Translation

The ORDERBY operator can be translated into a call to the ORDERBY or ORDERBYDESCENDING query operator method (depending on the type of sort) for the first sort and then into a call to the THENBY and THENBYDESCENDING query operator method for following sorts. For example the query expression:

```
    From a In Authors_
    Order By a.State, a.City Descending_
    Return a.Name
can be equivalent to:
    Authors.OrderBy(a=> a.State).ThenByDescending(a => a.City)._
    Select(a => a.Name)
```

RETURN and SELECT Operator Translation

The RETURN operator can be translated into a call to the SELECT query operator method. For example:

```
    From e In Employees_
    Return e.Name
can be equivalent to:
    Employees.Select(e => e.Name)
```

The SELECT operator can be translated into a call to the SELECT query operator method and the construction of an anonymous type. For example:

```
    From e In Employees_
    Select e.Name, e.Salary
can be equivalent to:
    Employees.Select(e => new With {e.Name, e.Salary})
```

DISTINCT Operator Translation

The DISTINCT operator can be translated into a call to the DISTINCT query operator method. For example:

```
    From e In Employees_
    Distinct
can be equivalent to:
    Employees.Distinct( )
```

TAKE or SKIP [WHILE] Operator Translation

The TAKE or SKIP operators can call the respective TAKE or SKIP query operator method. For example:

```
    From e In Employees_
    Order By e.Salary Descending_
    Return e.Name
    Take 5
```

-continued

```
can be equivalent to:
    Employees.OrderByDescending(e => e.Salary).
    Select(e => e.Name).Take(5)
``` and the query:

```
    From e In Employees_
    Order By e.Salary Descending_
    Return e.Name
    Skip 5
can be equivalent to:
    Employees.OrderByDescending(e => e.Salary).
    Select(e => e.Name).Skip(5)
```

When used in conjunction with the WHILE modifier, a conditional expression can be created to apply to the underlying TAKEWHILE or SKIPWHILE query operator. For example, the query:

```
    From e In Employees_
    Order By e.Salary Descending_
    Take While e.Salary > 50000_
    Return e.Name
can be equivalent to:
    Employee.OrderByDescending(e => e.Salary)._
    .TakeWhile(e => e.Salary > 50000).Select(e => e.Name)
```

GROUPBY and AGGREGATE Operator Translation

The GROUPBY operator followed by an aggregating SELECT or RETURN operator can be translated into a call to the GROUPBY query operator method followed by an aggregation over the constructed groups. For example the query:

```
    From C In Customer_
    Group By C.State_
    Aggregate Youngest = Min(c.Age), Oldest = Max(c.Age)
    Select State, Youngest, Oldest
can be equivalent to:
    Customers
    .GroupBy(c => New Witth { .State = c.State }, _
    (g, k) => New With { .State = k, _
    .Youngest = g.Min(c => c.Age),
    .Oldest = g.max(c => c.Age) })
```

Example Objects

All of the examples included herein use one of two separate sets of objects. The Company objects can represent information about a company, and can be connected hierarchically:

```
    Class Company
        Dim Name As String
        Dim Employees As List(Of Employees)
        Dim Customers As List(Of Customer)
    End Class
    Class Customer
        Dim Name As String
        Dim Orders As List(Of Order)
```

-continued

```
    End Class
    Class Order
        Dim Product As String
        Dim Price As Integer
    End Class
    Class Employee
        Dim Name As String
        Dim Birthday As Date
        Dim Position As String
        Dim Salary As Decimal
    End Class
    Dim Employees As List(Of Employee)
    Dim Customers As List(Of Customer)
```

The Book objects can represent information about books stocked in, e.g., a bookstore, and can be connected relationally:

```
    Class Book
        Dim BookID As Long
        Dim Title As String
        Dim PublisherID As Long
        Dim Price As Double
    End Class
    Class Author
        Dim AuthorID As Long
        Dim Name As String
        Dim Address As String
        Dim City As String
        Dim State As String
        Dim ZIP As String
    End Class
    Class BookAuthor
        Dim BookID As Long
        Dim AuthorID As Long
    End Class
    Class Publisher
        Dim PublisherID As Long
        Dim Name As String
        Dim Address As String
        Dim State As String
    End Class
    Dim Books As List(Of Book)
    Dim Authors As List(Of Author)
    Dim BookAuthors As List(Of BookAuthor)
    Dim Publishers As List(Of Publisher)
```

Figure 4:
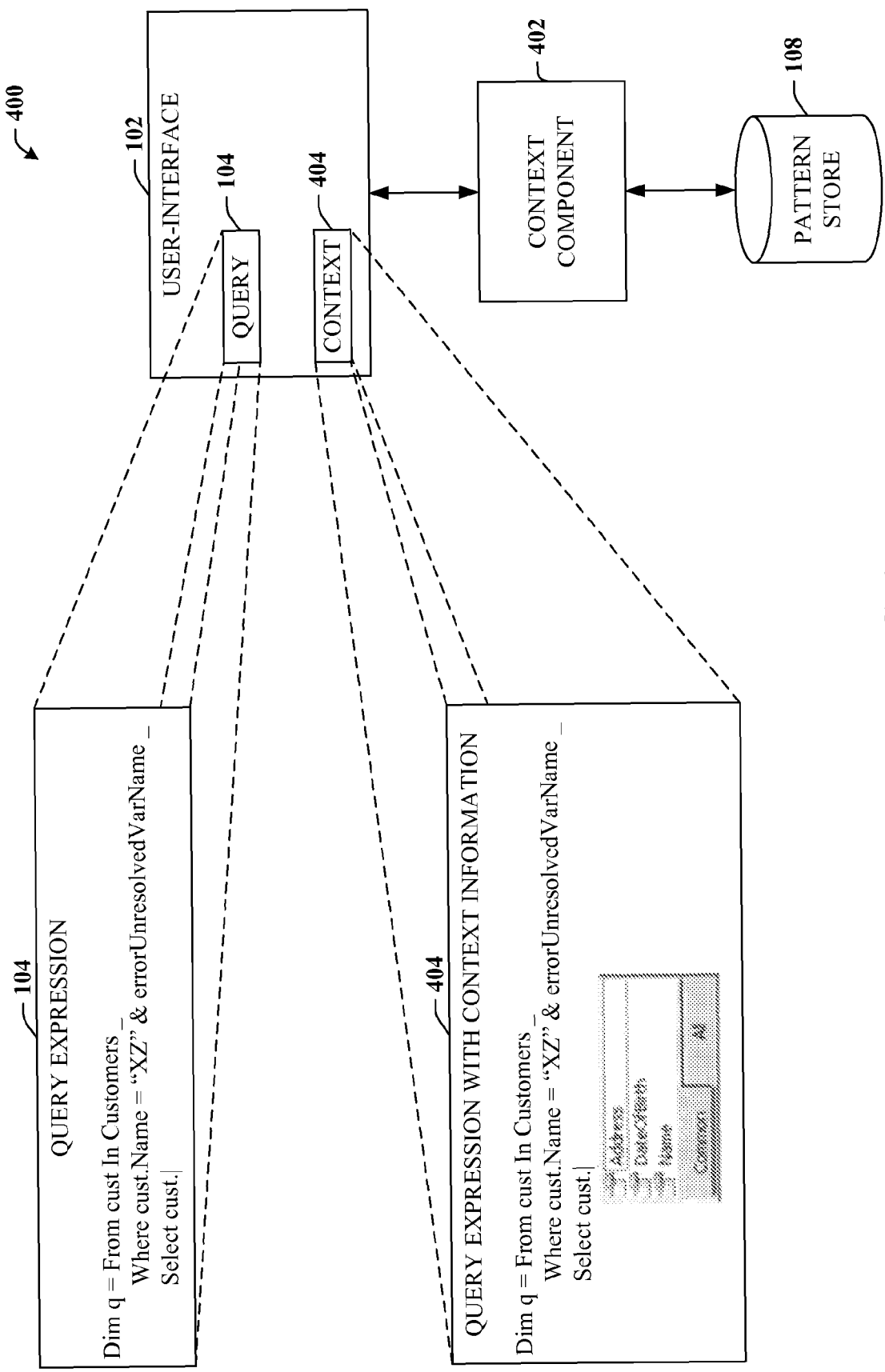
FIG. 4 is a block diagram of a computer-implemented system that can infer in real-time an element type and/or incrementally provide context information based upon the inferred element type.

With the foregoing in mind and turning now to FIG. 4, a computer-implemented system 400 that can infer in real-time an element type and/or incrementally provide context information based upon the inferred element type is depicted. Generally, the system 400 can include the user-interface 102 that can receive a query expression 104 as substantially described supra in connection with FIG. 1. In addition, the system 400 can include the pattern store 108 that can be operatively coupled (not shown) to the user-interface 102 and/or to a context component 402. The context component 402 can examine the query expression 104 and make inferences in real-time that relate to element types. For example, as previously described, since the query operator for each query clause conforms to a specific patter (e.g., the query operator patterns 106 from FIG. 1), and further, since the element type can flow from one query clause to the next query clause, these two pieces of information can be employed to determine an element type for any given next query clause.

When the query operators are described as method calls and the query operations are applied as a pure mechanical transforms, it is generally required that the type resolution take place during overload resolution. In this way, given that the query operators can flow types from one operator to another, an operator generally must be fully bound to be able to provide the type to the next operator to be applied. As a result, if overload resolution fails due to a syntax error or some other problem, there is no conventional mechanism through which to provide type information to the next operator that is applied. Compositional query operators (discussed in more detail infra beginning with FIG. 6) without this type flow mechanism results in odd error messages, different expression semantics, a lack of context information for auto-completion, and slower compiler throughput overall.

As described, the claimed subject matter can adopt a formalization of the pattern of the query operators that can allow the element type to not rely on full method binding and instead depend upon the pattern of the particular operator being employed. By way of further illustration, consider the present exemplary query expression 104 that is received by the user-interface 102 (e.g., as the query expression 104 is being typed):

```
    Dim q = From cust In Customers_
        Where cust.Name = "XYZ" & errorUnresolvedVarName_
        Select cust.
```

The first query clause includes the FROM operator, which can introduce a queryable source type, "Customers" as an anonymous element type, "cust", which can be an element of the source type. As discussed, the element type can flow to the next query clause, where the WHERE operator can filter the collection, but otherwise does not alter the element type. Finally, the element type flows to the next query clause, where the SELECT operator and a portion of the function the SELECT operator method expects to receive can be found, but with the remainder of the next query clause as yet incomplete.

The element type that flows into the SELECT clause can now serve as a source type for that particular query clause. The context component 402 can, thus, infer in real-time the element type (e.g., cust) for this query clause based upon the source type and the query operator. Accordingly, the inference can be entirely local and without the need for full translation of the query expression 104. Rather, the context component 402 can perform the inferences in a manner similar to a background compiler.

In addition, the inferences of the context component 402 can facilitate greater efficiency in a number of ways. For example, inferences need only be performed a single time when translations are performed. Thus, if there are two WHERE operators in the query expression 104, then the translation for the second WHERE operator need not be required. In addition, the inferences can be employed in connection with the full and customarily more expensive compilation so as to short circuit the type discovery that generally must be performed. As such, inferring the element types in advance can be employed in a variety of ways to hasten compilation time.

Moreover, once the context component 402 infers the element type (here, "cust" in the "Select cust." query clause), the context component 402 can in real-time provide context information 404. For example, when the dot is typed in "cust." the context information 404 can be provided in the form of a convenient and familiar pop-up window to allow for auto-completion as illustrated, or in another form. It is to be understood, that such a feature is not conventionally available for query expressions since query expressions (conventionally) must be translated first before the element types can be determined. And since supplying a complete and error-free query expression is a prerequisite for conventional translation/compilation, any similar context and/or autocompletion mechanism has heretofore been precluded.

While the context information 404 can be of great utility for query expressions, and is largely illustrated in the context of providing contextual feedback in an IDE, neither case is necessary. For example, what is described herein can be applicable to more than just query operators of a query expression. In particular, the notions of type flows from and relationships between one operator and the next could apply to any operator or any API where the type flow can be of use. One such example exists in chaining API calls together (e.g., pipelines included in a command line where it is intended that the type flows from one command to the next. Another example can be late binding where there are no types, but some form of flow can be employed such as for late-bound optimization.

It is to be further understood that the inferences performed by the context component 402 can be entirely predetermined based upon the known information received (e.g., a source type in connection with a known and defined query operator), or in accordance with other aspects, the inferences can be probabilistic. For example, when employed with different types of operators, the context component 402 can be employed to examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
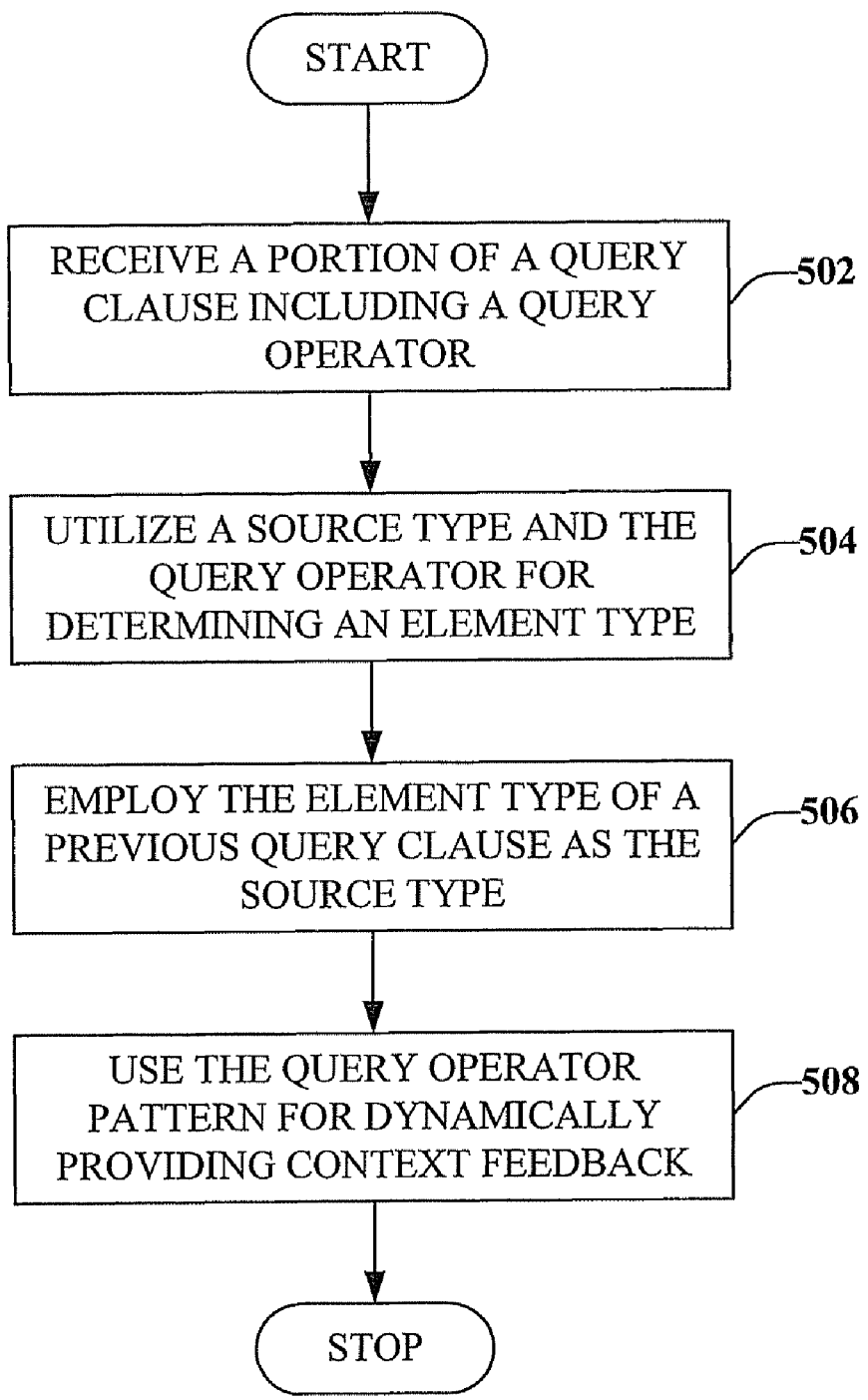
FIG. 5 depicts an exemplary flow chart of procedures that define a computer-implemented method for facilitating type flow of element types within a query expression.

FIG. 5 illustrates a methodology in accordance with the claimed subject matter. While, for purposes of simplicity of explanation, this and other methodologies herein are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 5, a computer-implemented method for facilitating type flow of element types is illustrated. Generally at reference numeral 502, a portion of a query clause including a query operator can be received. The query operator can be mapped to an associated method call that can receive arguments (e.g., functions, values, collections . . . ) and can return typed results (e.g., queryable types, numeric types, ordered collections . . . ). The method call can be defined according to a query operator pattern.

At reference numeral 504, a source type and the query operator can be utilized for determining an element type. For example, since the query operator pattern can be formalized, the pattern of the query operator can be employed in connection with the source type to infer the element type. At reference numeral 506, the element type of a previous query can be employed as the source type for the act of utilizing discussed at reference numeral 504. In accordance therewith, the element type can flow from one query clause to a next query clause in a recursive manner.

With the foregoing in mind, it will be appreciated and understood that certain features and/or aspects can be employed for extending query capabilities of programming languages in other ways. As one example, the aspects developed herein can be effectively utilized in order to provide computer-based and/or language-based constructs such as comprehensions with the compositional abilities conventionally associated with API calls. A description of these and other related concepts can be found with reference to FIG. 6

Figure 6:
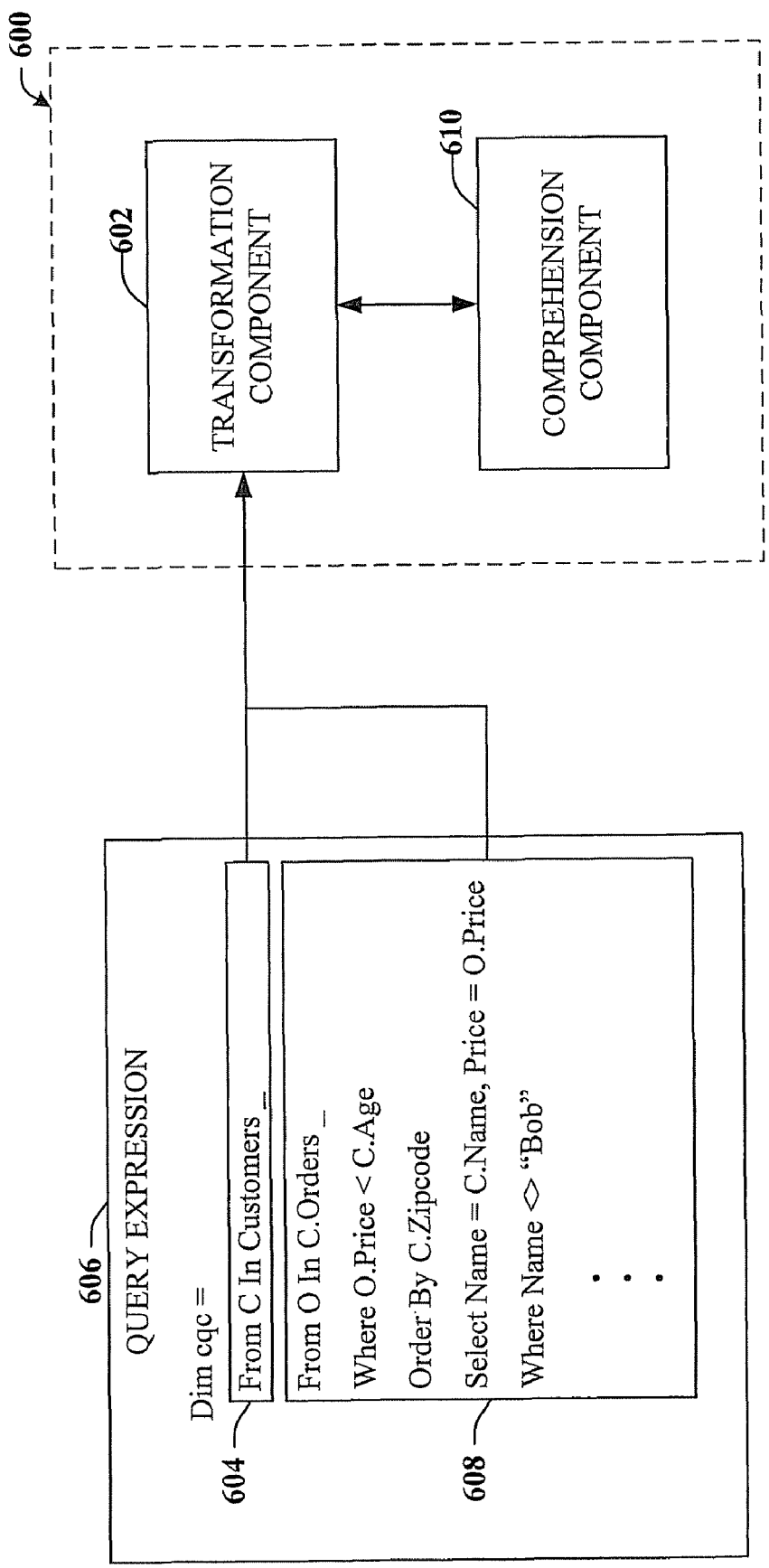
FIG. 6 is a block diagram of a computer-implemented system that can facilitate a composable query comprehensions and/or an extensible query expression.

Turning now to FIG. 6, a block diagram of a computer-implemented system 600 that can facilitate composable query comprehensions and/or extensible query expressions is provided. In general, the system 600 can include a transformation component 602 that can receive initialization data 604. As depicted, the initialization data 604 can be the first query clause in exemplary query expression 606, wherein the first query clause is typically limited to being a FROM clause (e.g., the query operator of the first query clause is a FROM operator). The initialization data 604 can include a collection (e.g., Customers, as shown) or an expression (e.g., Tax=b.Price*0.088, as described supra in connection with the FROM operator detailed with regard to FIG. 3). In either case, the initialization data can also include a control variable that, depending upon the application, is associated with either the collection (e.g., C is a control variable) or the expression (e.g., Tax is a control variable).

The transformation component 602 can also receive a set of query clauses 608 in a sequence characterized by the query expression 606. It is to be appreciated that the set of query clauses 608 can be an empty set, in which case the query expression 606 is comprised of a single query clause (e.g., the FROM clause employed as initialization data 604), as will be described in more detail infra. As can be done with the initialization data 604, the transformation component 602 can also resolve (e.g., populate or transform) the control variables in scope for each query clause in the set 608. For example, the transformation component 602 can process each query clause in the set 608, in turn, in the order dictated by the query expression 608 by applying the query operator of each query clause to the available types.

It is to be appreciated that in accordance with the claimed subject matter, the set of query clauses 608 need not be restricted by a ubiquitous syntactical template such as, e.g., FLWOR/FLWR as defined by versions of XQuery-brand languages or Select-From-Where as expected in implementations of SQL. Rather, the set 608 can be compositional in nature such that individual query clauses can be validly supplied, pieced together in a modular way, and yield intuitive results even when the order of the operators is arbitrary.

In accordance therewith, the system 600 can also include a comprehension component 610 that can manage the scope for all control variables introduced by the query expression 606. The scope of a control variable can be determined based upon the operator of a query clause, and the control variables in scope can be passed to the next query clause. For example, the transformation component 602 can establish what can be thought of as a pipeline such that certain information can flow from one query clause to the next query clause by way of the pipeline. Thus, the transformation component can receive a collection in connection with a query clause, transform (e.g., filter, project . . . ) the collection based upon the operator associated with the query clause, and output the transformed collection to the pipeline such that it is available to the next query clause.

Analogously, the control variables in scope can also be passed to the next query clause, and precisely what control variables are in scope can be defined by the comprehension component 610 based upon the types of query clauses received. Typically, the next query clause can only have access to the variables that are in scope. This feature as well as others can be further described by referring to FIG. 7 in addition to FIG. 6.

Figure 7:
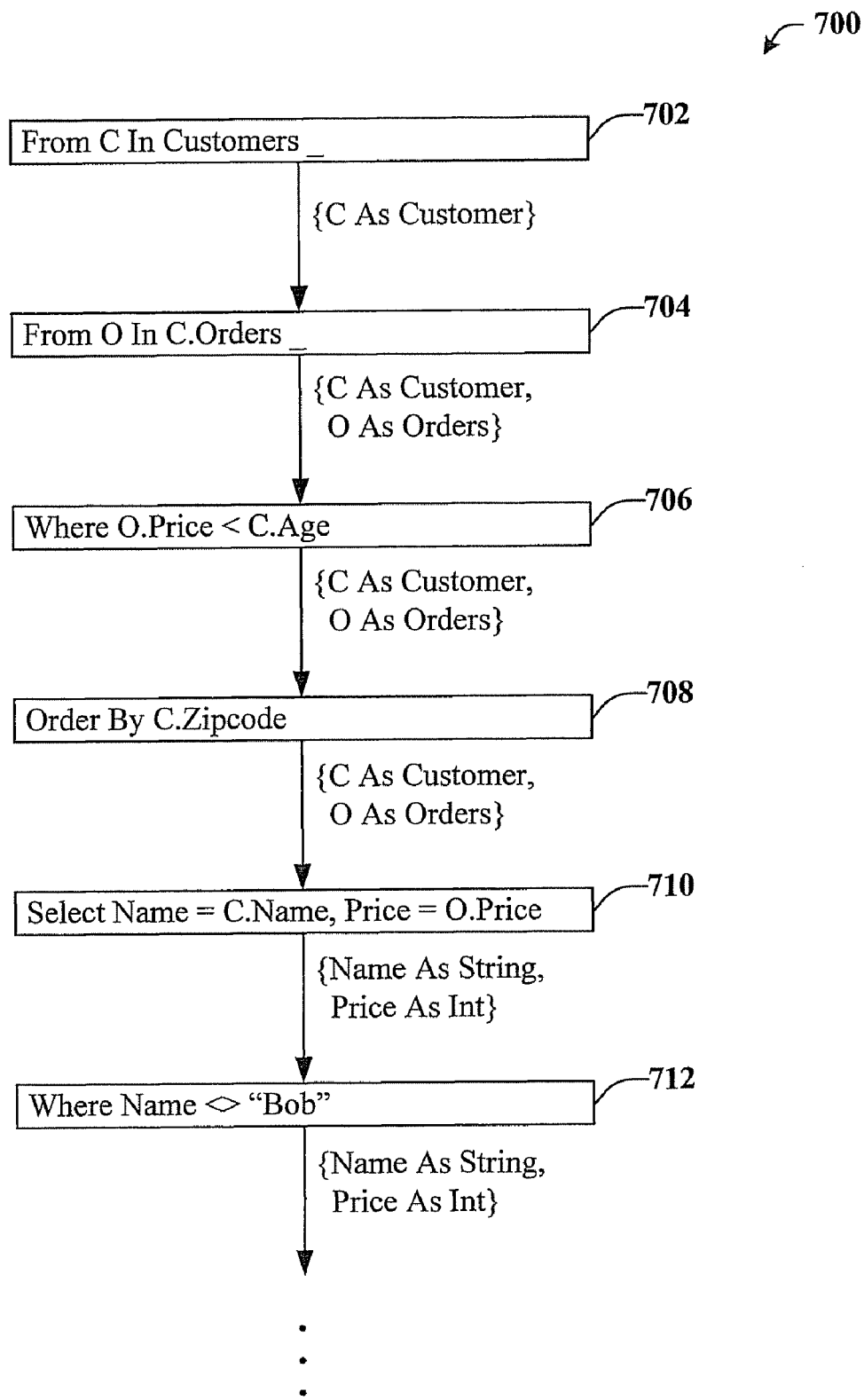
FIG. 7 illustrates a block diagram of an exemplary depiction relating to the scope of control variables that result from example query clauses of an example query expression.

FIG. 7 is an exemplary illustration relating to the scope of control variables for the example query expression 606, as can be determined by the comprehension component 610. According to an aspect of the claimed subject matter, the comprehension component 610 can declare a new control variable (and can bring the new control variable in scope) based upon a type of query clause/operator. For example, some types of query clauses can introduce new control variables in addition to the control variables already in scope, namely, the FROM, LET, SELECT, or GROUPBY query clauses can produce this outcome. Control variable introduced by a FROM clause are typically accumulated until a next SELECT or GROUPBY clause, after which they can be taken out of scope by the comprehension component 610. Such a case is illustrated by the FROM clauses 702, 704 (which map to the initialization data 604 and the initial query clause included in the set of query clauses 608), whose control variables stay in scope until the application of the SELECT clause 710.

Clause 702 introduces the Customer collection and the control variable C. Hence, this information can be supplied by way of a pipeline to the next query clause. Accordingly, {C As Customer} can be made available the clause 704. Clause 704 is also a FROM clause, which is possible due to the compositional nature of the claimed subject matter. Clause 704 employs the control variable C to introduce a new collection, C.Orders (e.g., all orders for all customers) as well as the new control variable, O, which the comprehension component 610 can bring into scope. Thus, the next query clause 706 has access to both control variables in scope, C and O.

As substantially described above, while certain query clause types can affect the variables in scope, other query clause types (e.g., WHERE, ORDERBY, DISTINCT, etc.) need not. Thus, while query clauses 706 and 708 can affect the collection, the variables in scope (e.g., C and O) can be the same, and thus accessible by query clause 708 and 710, respectively, as each clause is received by the transformation component 602.

In accordance with an aspect of the claimed subject matter, the comprehension component 610 can take an existing control variable out of scope based upon a type of query clause received. The SELECT query clause 710 provides a characteristic illustration of this feature. Query clause 710 is exposed to control variables C and O, but one of the features of a SELECT clause can be to hide the current control variables in scope and introduce new control variables in scope (e.g., Name As String and Price As Int). Query clause 712 can be supplied with these new control variables, Name and Price, but generally cannot access the previous control variables (e.g., C and O) that the comprehension component 610 took out of scope in connection with the SELECT clause 710.

A second feature to be noted is that the WHERE clause 712 follows the SELECT clause 710. Conventional query languages terminate the query upon application of a query clause with a projection operator such as SELECT, RETURN, or a like operator. If a user of such conventional query languages desires to continue query operations after a projection, a new query must be implemented that can reference the results of a previous query. Yet due, e.g., to the compositional nature of the claimed subject matter, the query expression 606 can include multiple SELECT clauses and the query expression 606 can continue after the occurrence of a SELECT clause (e.g., as illustrated by clause 712). In a similar vein, while mentioned in a previous section, it should be pointed out that the query expression 606 includes two FROM clauses as well (e.g., clauses 702 and 704), which is a further aspect that conventional query languages fail to provide for.

While not depicted by express examples, the query expression 606 can also include other query clause types, and in particular, many of these other query clause types can affect the scope of control variables. For example, upon receipt of a RETURN clause, the comprehension component 610 can bring all control variables out of scope. As another example, based upon a type of query clause, the comprehension component 610 can declare and scope (e.g., bring into scope) new control variables while scoping extant control variables (e.g., control variables in scope for a previous query clause) for a particular set of subsequent query clauses. GROUPBY, AGGREGATE, et al. can facilitate such behavior whereby the extant control variables can be scoped over a range of AGGREGATE query clauses spanning the each GROUP operator.

According to another aspect of the claimed subject matter, the comprehension component 610 can generate an alias for a tuple of all control variables in scope based upon a type of query clause received. For example, an INTO query clause can facilitate the creation of the alias, e.g., by the comprehension component 610, even though the alias need not itself be a control variable.

While still referring to FIGS. 6 and 7, various additional aspects of the claimed subject matter can be underscored. While a number of advantages that relate to the extensibility of valid query expressions 606 (e.g., the query expression 606 can be extended with virtually any number of query clauses of virtually any type), another advantage can be that the query expression 606 can terminate at any point as well. Thus, while the query expression 606 has the potential to include an indefinite number of query clauses, the entire query expression 606 can also be comprised of only a single query clause that terminates after the introduction of a single control variable. Hence one of the simplest examples of a complete and valid query expression 606 is a query expression 606 that includes only the initialization data 604:

From C In Customers without a requirement that the query expression 606 include an explicit SELECT, RETURN, or other terminal query operator.

By way of explanation, the transformation component 602 can be configured to append an implicit SELECT or RETURN to each query clause received. Thus, as long as a resultant collection included in the pipeline is in a desired shape, there is no need to for an explicit statement to select or return these intermediate results. Rather, if the query expression 606 ends after any one of the given clauses, say, 702-708, the collections in the pipeline can be output a result and a format of the output can be inferred based upon the number of control variables in scope.

For example, if the query expression 606 terminated after any of the clauses 704-708 (where in each case there are two control variables in scope, C and O), it can be inferred that the desired output should exist as a collection of name-value pairs. Accordingly, the output can be a tuple with a field for each control variable. On the other hand, in the case where there is only one control variable in scope, such as after clause 702, an implementer of the query expression 606 would not normal expect to get back a tuple with a field c. Rather, the implementer would likely desire the collection of customers. So in the case where there is only one control variable in scope, the output can be simply the underlying values of the collection.

In accordance with an aspect of the claimed subject matter, control variables introduced by a FROM clause can be associated with an expression as well as a collection. As a representative example, consider the following query fragment introduced above:

---
From b in Books_
From Tax = b.Price * 0.088_

---

The first FROM clause introduces a control variable b for the collection, Books, which is brought into scope and accessible to the next query clause. The next FROM clause introduces the control variable Tax associate with an expression (rather than a collection), b.Price*0.088. With the latter of the two FROM clauses, an effect can be that an accessible name is provided for the results of the expression. This name can be referred to by the control variable tax that can remain in scope until, e.g., a subsequent SELECT clause. This feature can be thought of as similar to a procedural statement within the query, which can allow values of an expression to be computed once even though the values may be employed numerous times subsequently, the values need not be recomputed.

According to another aspect of the claimed subject matter, set operations can be employed within the context of a single query expression 606. While conventional query languages typically only provide for a single collection as an input, the transformation component 602 can receive two collections as input. For example, the transformation component 602 can be configured to receive multiple collections and can output a single collection with control variables associated with the multiple collections merged according to a type of the query clause (e.g., a UNION clause, an INTERSECT clause . . . ). The merged control variables can be brought into scope, pass through the associated set operator, and be made accessible to the next query clause, so the query expression 606 can be continued. The control variables generally must be of the same type and generally must have the same name, but they can, of course, be associated with two different collections.

Figure 8:
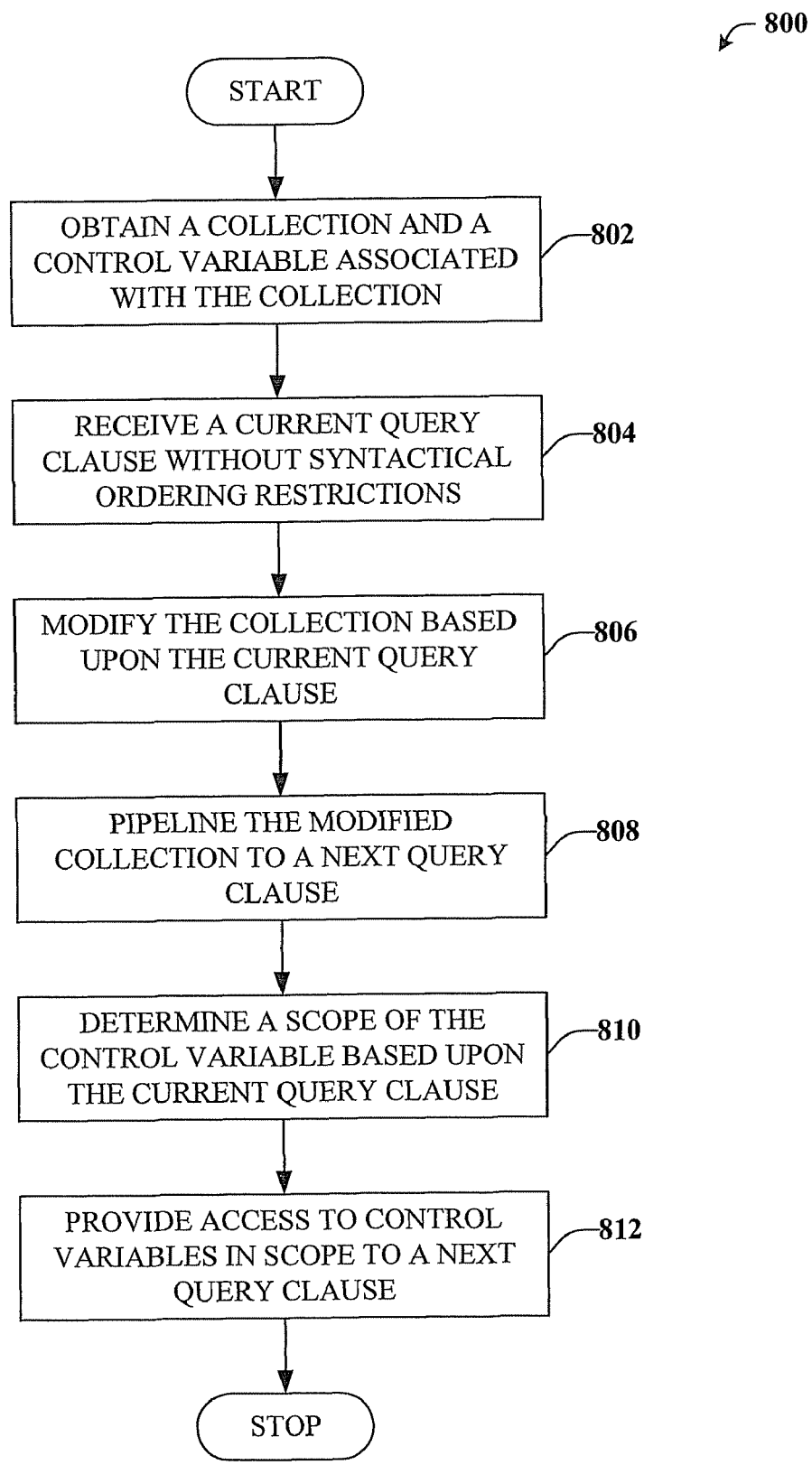
FIG. 8 depicts an exemplary flow chart of procedures defining a computer-implemented method for facilitating construction of query comprehensions in a compositional manner.

Turning now to FIG. 8, a computer-implemented method 800 for facilitating construction of query comprehensions in a compositional manner is illustrated. Beginning with reference numeral 802, a collection (or expression) and a control variable associated with the collection (or expression) can be obtained. In general, this obtained data is a product of the first query clause of a query expression, which is usually a FROM clause. At reference numeral 804, a current query clause from a set of query clauses included in a query expression can be received. It is to be appreciated that unlike conventional languages that require comprehensions to be monolithic, no syntactical ordering restriction need be placed on the current query clause or, for the most part, on the query expression as a whole.

At reference numeral 806, the collection can be modified in accordance with the current query clause. Simply put, the collection received as input can be transformed based upon the guidelines of the query operator associated with the current query clause. It is to be appreciated that the current query clause can be evaluated in accordance with an expected type associated with the current query clause rather than based upon monolithic syntactical templates. Next, at reference numeral 808, the modified collection can be piped to a next query clause. Hence, the output of the current query clause can be employed as an input for the next query clause.

At reference numeral 810, a scope for the control variable can be determined based upon the current query clause. For example, some types of query clauses do not facilitate any change to the extant control variables, while other query clauses can facilitate introduction of new control variable (in some cases only for a particular series of next query clauses), while still others can facilitate bringing extant control variables out of scope while (optionally) introducing new control variables. At reference numeral 812, access to the control variables in scope for the current query clause can be provided to the next query clause.

Figure 9:
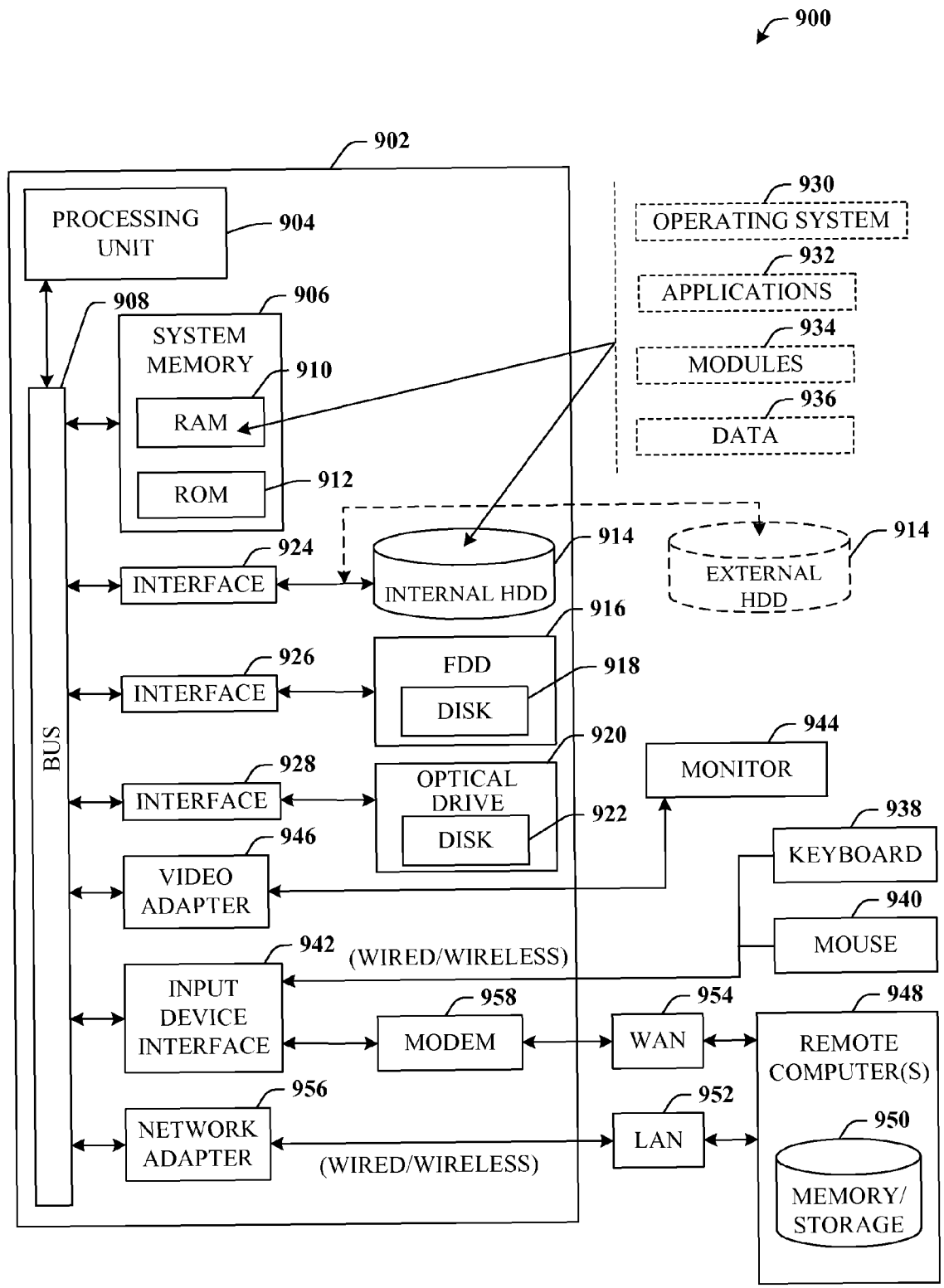
FIG. 9 illustrates a block diagram of a computer operable to execute the disclosed architecture.

Referring now to FIG. 9, there is illustrated a block diagram of an exemplary computer system operable to execute the disclosed architecture. In order to provide additional context for various aspects of the subject invention, FIG. 9 and the following discussion are intended to provide a brief, general description of a suitable computing environment 900 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the invention includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the subject invention.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated.

The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 9BaseT wired Ethernet networks used in many offices.

Figure 10:
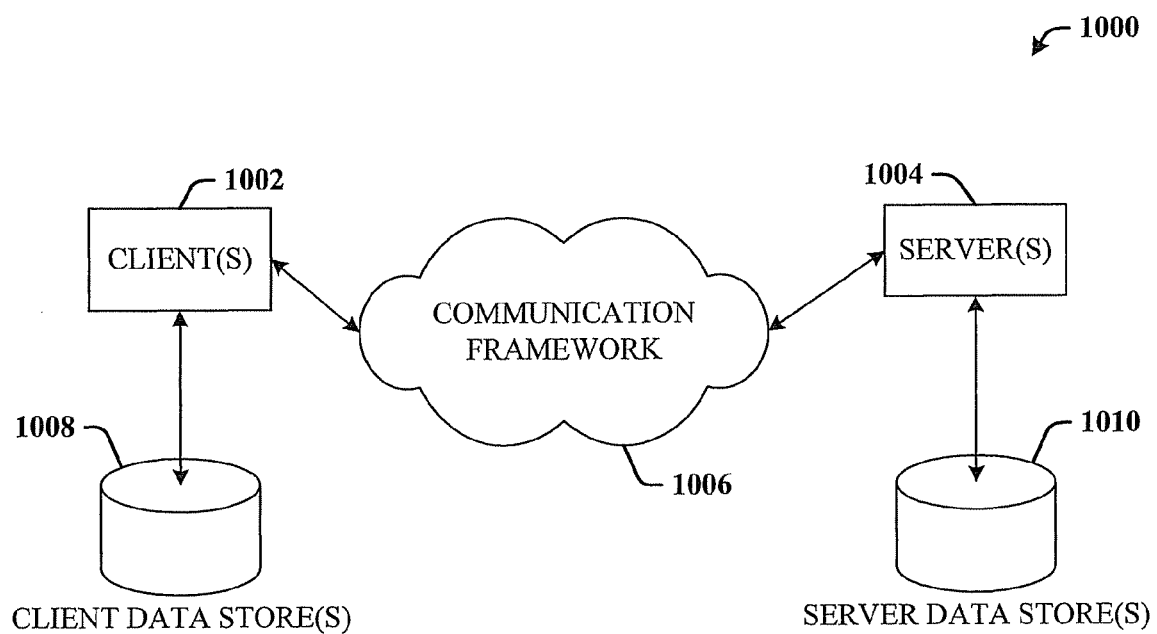
FIG. 10 illustrates a schematic block diagram of an exemplary computing environment.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that facilitates query comprehensions, comprising:
   a processor; and a memory communicatively coupled to the processor, the memory having stored therein computer-executable instructions configured to implement the query comprehension system including:
   a comprehension component that manages a scope of a control variable; and
   a transformation component that receives from a user a query that includes initialization data and a set of query clauses in a sequence characterized by a query expression, wherein the user can perform at least the following:
   input new control variables into the received user-inputted query, the control variables comprising unique local variables that are configured to represent a property or column of an individual data row in a collection as the user-inputted query evaluates, hide existing control variables in the user-inputted query that are determined to be out of scope when the hidden variables are no longer part of the user-inputted query, reveal hidden variables that are determined to be in scope when the previously hidden variables are now part of the user-inputted query and implement the existing control variables in a different syntactical order than that in which the new control variables were inputted in the user-inputted query, wherein the control variable of the user inputted query have no syntactical order restriction, and wherein:

the initialization data includes a control variable and at least one of a collection or an expression;

the transformation component resolves values of the control variable in scope for each query clause, and based upon a type of each query clause, respectively;

the transformation component operates on each query clause in a manner that is independent of an ordering of the sequence; and the transformation component outputs the results of the transformation performed on the collection or expression based upon the query expression and based on the number of control variables in scope, wherein the format in which the results are output is variable depending on the number of control variables in scope.

2. The system of claim 1, the comprehension component declares a new control variable and bring the new control variable in scope based upon a type of query clause received.

3. The system of claim 1, the comprehension component takes an extant control variable out of scope based upon a type of query clause received.

4. The system of claim 1, the comprehension component, based upon a type of query clause received, declares and scopes a new control variable and brings an extant control variable in scope for a particular set of subsequent query clauses.

5. The system of claim 1, the comprehension component takes all extant control variables out of scope based upon a type of query clause received.

6. The system of claim 1, the comprehension component generates an alias for a tuple of an extant control variable based upon a type of query clause received.

7. The system of claim 1, the transformation component uses results of a current query clause to process a next query clause in the sequence independent of the ordering of the clauses in the sequence.

8. The system of claim 1, the set of query clauses is not required to include an explicit termination query clause.

9. The system of claim 1, the transformation component is configured to append an implicit termination clause to each query clause received.

10. The system of claim 1, the transformation component is configured to allow arbitrary nesting of sets of query clauses.

11. The system of claim 1, the transformation component evaluates a query clause based upon an expected type associated with the query clause.

12. The system of claim 1, the transformation component is configured to receive multiple collections and output a single collection with control variables associated with the multiple collections merged according to a type of query clause.

13. The system of claim 2, the new control variable is associated with at least one of a collection or a computed expression.

14. The system of claim 7, the transformation component passes control variables in scope to the next query clause.

15. The system of claim 9, the implicit termination clause facilitates return of the values of the control variable when only one control variable is in scope.

16. The system of claim 9, the implicit termination clause facilitates return of a name-value pair tuple for each control variable when more than one control variable is in scope.

17. A computer-implemented method for facilitating construction of query comprehensions in a compositional manner, comprising:

employing a processor executing computer executable instructions stored on a computer readable storage medium to implement the following acts:

obtaining a collection and a control variable associated with the collection;

receiving from a user in succession a query that includes a current query clause from a set of query clauses included in a query expression without placing syntactical ordering restrictions on the query expression, wherein the user can perform at least the following:

input new control variables into the received user-inputted query, the control variables comprising unique local variables that are configured to represent a property or column of an individual data row in a collection as the user-inputted query evaluates, hide existing control variables in the user-inputted query that are determined to be out of scope when the hidden variables are no longer part of the user-inputted query, reveal hidden variables that are determined to be in scope when the previously hidden variables are now part of the user-inputted query and implement the existing control variables in a different syntactical order than that in which the new control variables were inputted in the user- inputted query, wherein the control variable of the user inputted query have no syntactical order restriction;

modifying the collection based upon the current query clause; and providing access to control variables that are in scope for the current query clause, the access is provided to a next query clause;

outputting the results of the transformation based upon the query expression and based on the number of control variables in scope, wherein the format in which the results are output is variable depending on the number of control variables in scope.

18. A computer-implemented system for facilitating compositional query comprehensions, comprising:

a processor;

a memory communicatively coupled to the processor;

the memory having stored therein computer-executable instructions configure to implement the query comprehension system including:

computer-implemented means for acquiring a collection or an expression, and a control variable associated with the collection or the expression; computer-implemented means for receiving from a user a query that includes a present query clause from a sequence of query clauses, the sequence is not required to conform to a predefined order, wherein the user can input new control variables into the received user-inputted query, the control variables comprising unique local variables that are configured to represent a property or column of an individual data row in a collection as the user-inputted query evaluates, hide existing control variables in the user-inputted query that are determined to be out of scope when the hidden variables are no longer part of the user-inputted query, reveal hidden variables that are determined to be in scope when the previously hidden variables are now part of the user-inputted query and implement the existing control variables in a different syntactical order than that in which the new control variables were inputted in the user-inputted query, wherein the control variable of the user inputted query have no syntactical order restriction;

computer-implemented means for transforming the collection based upon the present query clause, wherein the results of the transformation are outputted based on the expression and based on the number of control variables in scope, wherein the format in which the results are output is variable depending on the number of control variables in scope; and computer-implemented means for granting a next query clause access to control variables in scope for the present query clause.

* * * * *